(12) United States Patent
Johnson et al.

(10) Patent No.: US 10,685,064 B2
(45) Date of Patent: *Jun. 16, 2020

(54) EXECUTABLE GRAPH FRAMEWORK FOR THE MANAGEMENT OF COMPLEX SYSTEMS

(71) Applicant: Introspective Systems LLC, Portland, ME (US)

(72) Inventors: Caryl Erin Johnson, Portland, ME (US); Kay E. Aikin, Portland, ME (US); Alexander Johnson, South Portland, ME (US); Trevor Gionet, Jr., North Yarmouth, ME (US)

(73) Assignee: Introspective Systems LLC, Portland, ME (US)

( * ) Notice: Subject to any disclaimer, the term of this patent is extended or adjusted under 35 U.S.C. 154(b) by 240 days.

This patent is subject to a terminal disclaimer.

(21) Appl. No.: 15/954,338

(22) Filed: Apr. 16, 2018

(65) Prior Publication Data

US 2018/0246988 A1   Aug. 30, 2018

Related U.S. Application Data

(63) Continuation-in-part of application No. 14/683,099, filed on Apr. 9, 2015, now Pat. No. 9,946,809.

(Continued)

(51) Int. Cl.
| | |
|---|---|
| *G06F 16/00* | (2019.01) |
| *G06F 16/901* | (2019.01) |
| *G06F 16/9038* | (2019.01) |

(52) U.S. Cl.
CPC ...... *G06F 16/9024* (2019.01); *G06F 16/9038* (2019.01)

(58) Field of Classification Search
None
See application file for complete search history.

(56) References Cited

U.S. PATENT DOCUMENTS

| | | |
|---|---|---|
| 6,199,195 B1 | 3/2001 | Goodwin et al. |
| 6,282,708 B1 | 8/2001 | Augusteijn et al. |

(Continued)

OTHER PUBLICATIONS

Kay, "The Reactive Engine", Thesis, University of Utah, 100 pages (1969), retrieved from the internet: http://www.chilton-computing.org.uk/inf/pdfs/kay.htm#ref28 on Oct. 23, 2017.

(Continued)

*Primary Examiner* — Debbie M Le
(74) *Attorney, Agent, or Firm* — McDermott Will & Emery LLP; Wen Li

(57) ABSTRACT

The present invention addresses deficiencies of the art with respect to collaborative computer networks consisting of mixed data, control functions, analysis functions, and sensors in complex systems of systems. The method involves a database framework for representing complex heterogeneous characteristics of processes, systems, and systems of systems that feature many to many interrelationships. The homoiconic graph framework takes the form of an executable graph database, which is often faster for associative data sets, and maps more directly to object-oriented computer applications for large-scale operations. The invention provides a method to execute the graph database, in that the graph comprises nodes that are both data fragments and executable components. The graph is characterized as one or more homoiconic or executable graph frameworks, to distinguish this unique feature from the concept of a graph database, which generally is a repository of connected data only.

35 Claims, 16 Drawing Sheets

Fractal Executable Graphs

Related U.S. Application Data

(60) Provisional application No. 61/977,617, filed on Apr. 9, 2014.

(56) References Cited

U.S. PATENT DOCUMENTS

| | | | | |
|---|---|---|---|---|
| 8,237,716 | B2 * | 8/2012 | Kolipaka | G06T 11/206 |
| | | | | 345/419 |
| 8,578,389 | B1 * | 11/2013 | Boucher | G06F 9/4494 |
| | | | | 718/106 |
| 8,984,277 | B2 * | 3/2015 | Dasgupta | H04L 45/64 |
| | | | | 713/155 |
| 9,516,025 | B2 * | 12/2016 | Dasgupta | H04L 45/64 |
| 9,589,068 | B2 | 3/2017 | Iskander et al. | |
| 9,641,580 | B2 | 5/2017 | Zhou et al. | |
| 9,665,660 | B2 * | 5/2017 | Wensel | G06F 16/9024 |
| 9,946,809 | B2 | 4/2018 | Johnson et al. | |
| 2009/0064053 | A1 * | 3/2009 | Crawford | G06F 3/04845 |
| | | | | 715/854 |
| 2016/0117358 | A1 | 4/2016 | Schmid et al. | |
| 2017/0011016 | A1 | 1/2017 | Shelline et al. | |

OTHER PUBLICATIONS

Mohan, "Uniform Treatment of Code and Data in the Web Setting", Thesis, University of Western Ontario, pp. 1-67 (2010).

Mooers, "TRAC, A Procedure-Describing Language for the Reactive Typewriter", Communications of the ACM, vol. 9, No. 3, pp. 215-219 (1966).

* cited by examiner

Fractal Executable Graphs

Executable graph showing fractal application

Example Plexus for "Process Flow" domain

Example source of seismic phase data

Digitized Seismic Record

Relationships among hypocenter executable trees and record executable trees during association Relationships among hypocenter executable trees and record executable trees after association

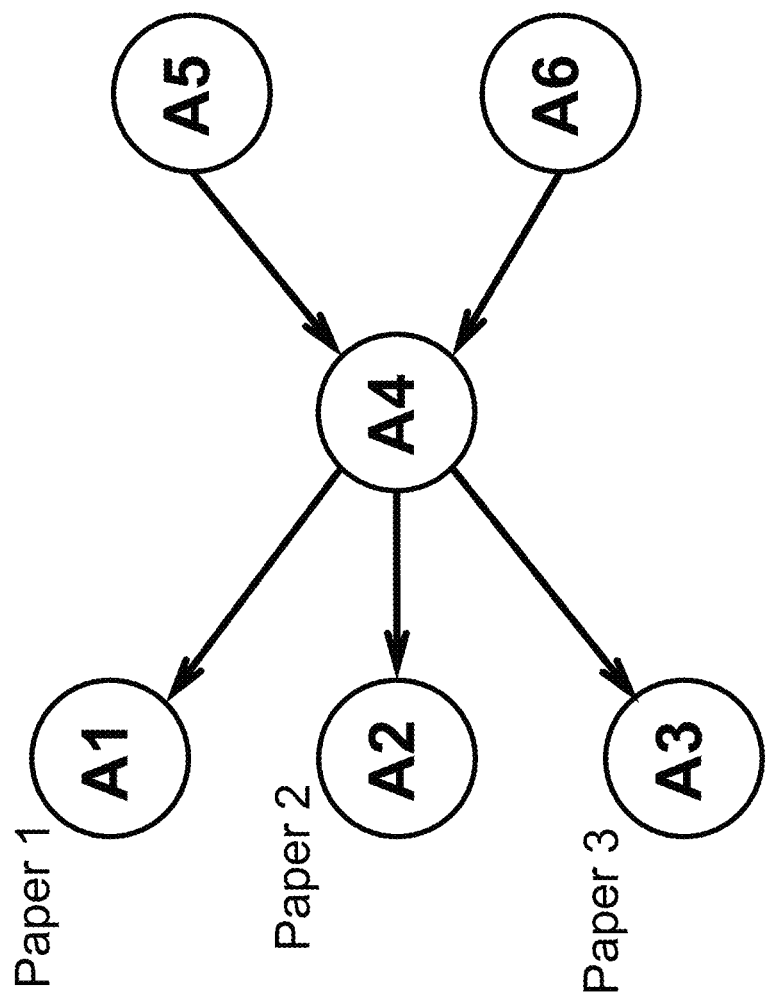

EXECUTABLE GRAPH FRAMEWORK FOR THE MANAGEMENT OF COMPLEX SYSTEMS

CLAIM OF PRIORITY

This application is a continuation-in-part of application Ser. No. 14/683,099, filed Apr. 9, 2015, now U.S. Pat. No. 9,946,809, which claims the benefit of priority under 35 U.S.C. § 119(e) to U.S. provisional application Ser. No. 61/977,617, filed Apr. 9, 2014, both of which are incorporated herein by reference in their entirety.

TECHNICAL FIELD

The technology described herein generally relates to methods of organizing, storing, presenting, and operating on information in systems, and more particularly relates to such methods that utilize a homoiconic (executable) graph structure, wherein the graph comprises nodes that are both executable code and data.

BACKGROUND

There are many market areas where businesses must define and manage large and complex information interrelationships. This is most acute in the interconnection and control of the billions of digital devices embedded in our daily lives. This is the future "Internet of Things", which has proven to be a problem space that many current approaches are ill-suited to tackle. Similar kinds of problems arise in information management systems, process control, or interactive adaptive control systems.

As these complex engineered systems become more ubiquitous, the interactions between different systems become more complex and unpredictable. Systems architects are responsible for developing processes and systems that can provide proper information and control for large and complex systems of systems (SoS). There is a critical need in many fields for an integrated approach that can collect, hold, synthesize, manage and control the relationships between systems and the data in the systems, and be scalable from the smallest to the largest, with similar processes operating on the various systems regardless of their size or type. The last need represents the fractal nature of a solution that is required to address complex systems effectively.

One common solution to these needs is the development of a database application that manages the storage of data and complex relationships, while another program processes and manages control messages at a single centralized point. This solution requires ever-increasing computing power and more complex message control. However, it is often the case that otherwise good intentions are thwarted as unintended consequences dominate the desired outcomes.

Many current approaches utilize graph databases as a simple repository for facts and local relationships within the data. However, these approaches have not been sufficient to address the overwhelming complexity of current datasets.

By contrast, in the technology presented herein the overall graph structure has meaning that integrates all of these relationships and control networks into a broader context; in the same sense that a 'forest' is more than a 'collection of trees'.

The discussion of the background herein is included to explain the context of the technology. This is not to be taken as an admission that any of the material referred to was published, known, or part of the common general knowledge as at the priority date of any of the claims found appended hereto.

Throughout the description and claims of the specification the word "comprise" and variations thereof, such as "comprising" and "comprises", is not intended to exclude other additives, components, integers or steps.

SUMMARY

The instant disclosure provides a method and system for a homoiconic, and reflective, framework in the form of an executable graph structure or framework (sometimes referred to herein as an "xGraph"). The present invention can be used as a foundation for a variety of applications. The concept of homoiconicity refers to the property that a program structure is similar to its data structure and is comprised of executable program code and data that co-exist. The invention includes a homoiconic structure wherein the data and executable aspects co-exist in a single framework. In this model, the data is the program and the program is the data. This allows the code to be accessed and transformed as data, using the same representation as the underlying data.

The executable graph is used as the basis for a dynamic computer process, either guided by a human analyst, or such that a framework can evolve by introspection and reflectivity of the executable graph or xGraph itself. In this latter sense, the components that comprise the framework are "aware" of how changes to the framework might improve the performance of the whole. The reflective concept embraces this global understanding, while the introspective aspect refers to how local changes to the framework might be expected to improve the global outcome using embedded computational intelligence.

The present invention includes a method for processing information, comprising: transforming the information into one or more homoiconic, reflective directed acyclic graphs, wherein the information comprises data and executable instructions embodied as entities; providing a user with a way to create one or more nodes in the one or more graphs, wherein the one or more nodes each have a set of executable instructions associated with them; providing the user with a way to connect a first graph of the one or more graphs to a second graph of the one or more graphs; providing the user with a way to assign the one or more nodes of the one or more graphs, using globally unique identifiers and strict rules, as apex nodes, top nodes, structure nodes, or leaf nodes; providing the user with a way to link the one or more nodes to each other using entity links and one or more of tree, plexus, or fabric structures; providing the user with a way to discover the capability of each of the nodes to connect with other nodes using discoverable entity interfaces and to connect nodes with other nodes using ephemeral entity links; providing the user with a way to execute the instructions associated with the one or more nodes, thereby processing the information; and displaying the results of executing the complex system in a form viewable by the user.

The present invention further includes a method to connect multiple homoiconic, reflective directed acyclic graphs to one another, thereby providing the user with a way to link one or more executable graphs to each other, and providing the user with a way to execute the instructions associated with the one or more connected executable graphs, thereby processing the information.

The present invention further provides for a computing apparatus configured to carry out, and a computer readable medium encoded with instructions for carrying out, the methods of the preceding paragraphs.

The present invention additionally includes a method for controlling a process, the method comprising: transforming the process into one or more homoiconic, reflective directed acyclic graphs, wherein the process comprises data and executable instructions embodied as entities; providing the user with a way to link the one or more executable graphs to each other; providing a user with a way to create one or more nodes in the one or more graphs, wherein the one or more nodes each have a set of executable instructions associated with them; providing the user with a way to assign the one or more nodes of the graph, using globally unique identifiers and strict rules as apex nodes, top nodes, structure nodes, or leaf nodes; providing the user with a way to link the one or more nodes to each other using entity links and one or more of tree, plexus, or fabric structures; providing the user with a way to discover the capability of each of the nodes to connect with other nodes using discoverable entity interfaces and to connect nodes with other nodes using ephemeral entity links; providing the user with a way to execute the instructions associated with the one or more nodes, thereby executing the process; and displaying the progress and outcome of the process in a form viewable by the user.

The present invention further provides for computing apparatus configured to, and computer readable medium encoded with instructions for, carrying out the method of the preceding paragraph.

The present invention includes a method for extracting knowledge from information, comprising: transforming the information into one or more homoiconic, reflective, directed acyclic graphs, wherein the information comprises data and executable instructions embodied as entities; providing the user with a way to link the one or more executable graphs to each other; providing a user with a way to create one or more nodes in the one or more graphs, wherein the one or more nodes each have a set of executable instructions associated with them; providing the user with a way to assign the one or more nodes of the graph, using globally unique identifiers and strict rules, as apex nodes, top nodes, structure nodes, or leaf nodes; providing the user with a way to link the one or more nodes to each other using entity links and one or more of tree, plexus, or fabric structures; providing the user with a way to discover the capability of each of the nodes to connect with other nodes using discoverable entity interfaces and to connect nodes with other nodes using ephemeral entity links; providing the user with a way to execute the instructions associated with the one or more nodes, thereby extracting knowledge from the information; and displaying the knowledge in a form viewable by the user.

The present invention further provides for computing apparatus configured to, and computer readable medium encoded with instructions for, carrying out the method of the preceding paragraph.

The present invention further provides for a method for creating an adaptive control network, comprising: representing a plurality of automata by a network comprising one or more homoiconic, reflective directed acyclic graphs, wherein the automata comprise data from one or more sensors, and executable instructions that control one or more actuators, wherein the executable instructions are embodied as entities; providing the user with a way to link one or more executable graphs to each other; providing a user with a way to create one or more nodes in the one or more graphs, wherein the one or more nodes each have a set of executable instructions associated with them; providing the user with a way to assign the one or more nodes of the graph, using globally unique identifiers and strict rules, as apex nodes, top nodes, structure nodes, or leaf nodes; providing the user with a way to link the one or more nodes to each other using entity links and one or more of tree, plexus, or fabric structures; providing the user with a way to discover the capability of each of the nodes to connect with other nodes using discoverable entity interfaces and to connect nodes with other nodes using ephemeral entity links; providing the user with a way to execute the instructions associated with the one or more nodes, thereby controlling the one or more automata within the executable graphs; and displaying the network of automata in a form viewable by the user.

The present invention further provides for computing apparatus configured to, and computer readable medium encoded with instructions for, carrying out the method of the preceding paragraph.

The present invention especially addresses today's technically challenging complex problem types that have some or all of the following characteristics: Many-to-many relationships; de-centralized complex systems (or systems of systems) with independently functioning constituents; dynamic (or unknown) structure and content of data input; and large data sets requiring a multitude of dynamic data views. These types of problem spaces are not well addressed (performance-wise) by most currently available database solutions in which an external program runs processes on, and is separate from, the data in the database.

These problem types can be grouped into four areas: information management (dynamic structure—static data with human analysis); process flow (static structure—dynamic data with human analysis); knowledge management (dynamic structure—dynamic data with human analysis), and adaptive collaborative automation (dynamic structure—dynamic data with machine analysis).

The probability of an unintended consequence increases exponentially as the level of complexity increases. The present invention is uniquely designed to deal directly with these sorts of problems because it is built from the ground up to address them. The invention links multiple systems and objects in more complex aggregations that become an introspective and adaptive "system of systems".

The present technology further comprises a visual management system that can define, create, update, query, and organize the administration of the executable graph, and is based on homoiconic graph frameworks.

The technology can be enhanced with a visual information manager (VIM), which uses a three dimensional representation comprised of a top layer (referred to elsewhere herein as the plexus), a bottom layer of interconnecting relationships (referred to elsewhere herein as the fabric, and a plethora of hierarchical structures (structural layer), such that each apex is associated with the plexus, and with leaf nodes associated with the fabric.

BRIEF DESCRIPTION OF THE DRAWINGS

FIG. 16: Example plexus structure that can be used in scientific authoring.

DETAILED DESCRIPTION

Figure 1:
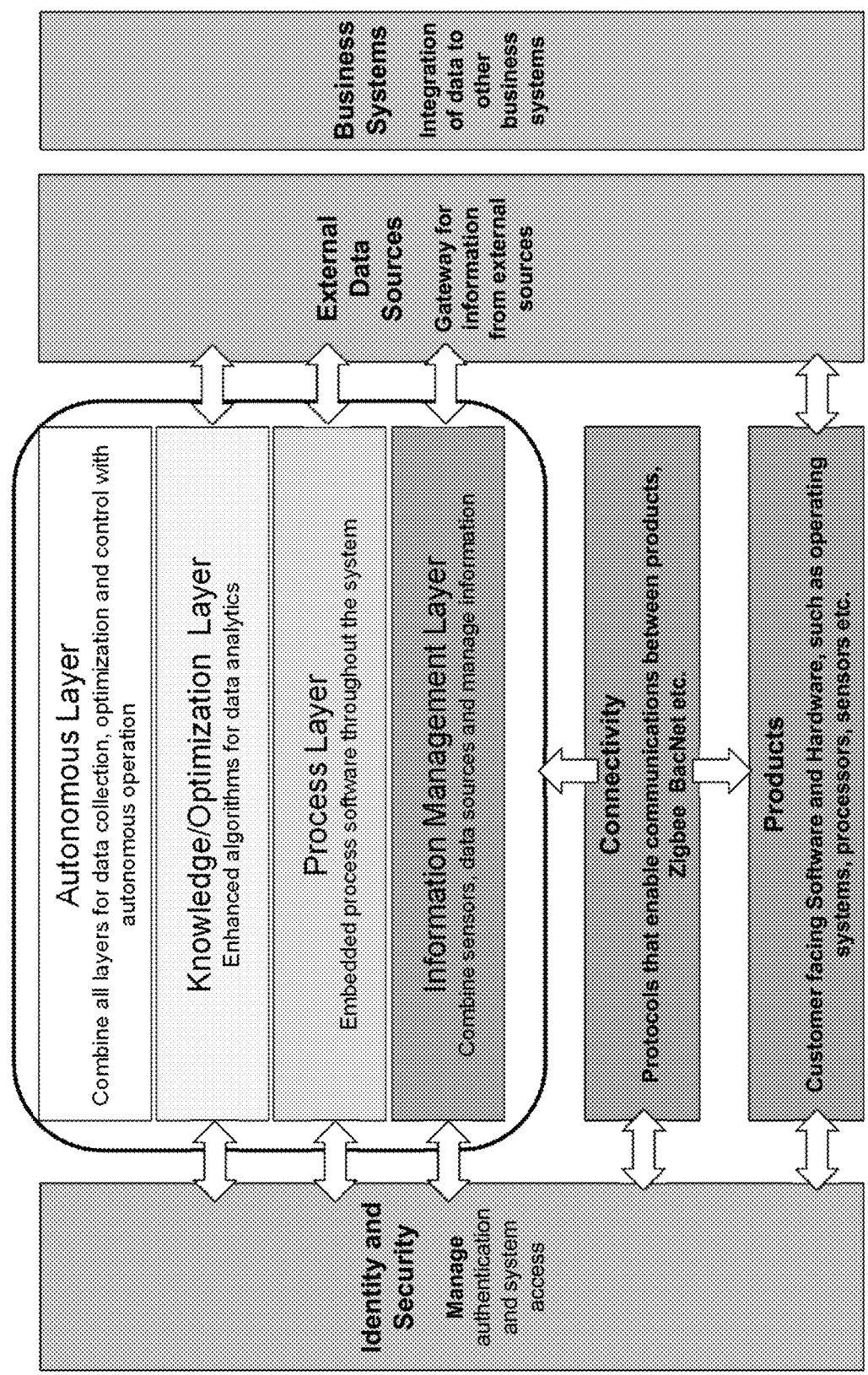
FIG. 1: Technology stack to describe the Internet of Things.

The instant technology is directed to an adaptive executable graph framework, or "executable graph", for representing complex heterogeneous characteristics of processes, systems, and systems of systems. As a graph framework, it features efficient support for many-to-many interrelationships among entities. However, the technology is more than a graph database because it supports entities (also known as nodes in graph database nomenclature) that are comprised of both data and executable software components. It is characterized as an executable graph to distinguish this unique feature ("code is data") from the concept of a graph database, which generally is a repository of data only. The executable graph technology is an adaptive framework in that its homoiconic nodes (code and data) can inspect and modify the structure of the framework as well as their own behavior.

Overview

A novel approach that is entirely absent in current practice is to emphasize the holistic context in that the approach mimics the organization of information in the human nervous system and brain from the perspective of neurophysiology. The human neurophysiological system is comprised of neurons, axons, and dendrites interconnected in complex ways via synapses. The neural system provides a network connecting inputs from sensors such as the eyes and ears, to actuators such as limbs, hands, and fingers that perform various actions in response.

In such a system, little semantic information is contained in the neurons, but instead the neurons provide a rather simple thresholding process: information and behavior of the systems is derived primarily from the evolution of the interconnectivity of the components—the neurons.

A new framework for integration of sensors and actuators can be patterned after the same principles that guide human neurophysiology. In this model, the nodes of a directed acyclic graph represent the role of the neurons. Parent to child links between nodes (edges in mathematical graph theory) are analogous to the axons that carry simple information (messages) from one neuron to the next. Interfaces as defined in the paradigm of object-oriented programming are analogous to the synapses. Thus, components of an executable graph can be directly connected to external sensor and actuators, such that the graph as a whole integrates information from the sensors and uses that information to control actuators in the external environment. This type of application would be used in, for example: the realm of adaptive robotics; or in the control capabilities of an unmanned aerial vehicle; or in an HVAC system where temperature and humidity sensors are integrated into a system of systems controlled by an executable graph. Sensors and actuators are also two of the kinds of "things" that make up the Internet of things.

Such a system is termed "homoiconic" because the framework is both the process as well as the semantic content embodied in a single framework. Alan Kay introduced the term homoiconic to represent a programming language where both the external and internal representations of the language are the same (Kay, Alan, *The Reactive Engine*, Ph.D. Thesis, University of Utah, (1969), incorporated herein by reference). One advantage of homoiconicity is that extending the framework with new concepts can be easily accomplished.

Another aspect of the instant technology is that graph frameworks can be connected to other graph frameworks. This is a unique feature in that the systems—as represented by one or more executable graphs—can be arbitrarily large when a single executable graph is connected to one or many other such graphs. This aspect provides for a 'fractal' nature of the technology in that, at any level of abstraction, an executable graph looks the same structurally as the prior level of abstraction. This is also known as expanding symmetry. Put another way, the system of systems looks the same structurally at every scale.

Executable Graph Framework

Mathematically, the instant technology is based on an extensible directed acyclic graph ("DAG"). (Extensible means that the graph can be added to.) A directed graph is a collection of nodes connected by edges (links) which have directionality. The structure of a directed acyclic graph is such that no matter how you follow the links from node to node, there are no loops—that is, no matter which path from node to node is followed, you can never get back to where you started. These principles are required of any graph for it to be called a DAG. The only exception to the strict acyclic requirement in the executable graphs of the present invention is that every node comprising an executable tree is directly linked to its Apex node, which is its primordial parent.

One aspect of the instant technology is that the framework is organized as a graph database when it is stored in computer memory.

The reflective property of an executable graph is the ability of the graph to modify the structure and behavior of the program that it represents.

Another aspect of the instant technology is that the graph framework is homoiconic in nature. All databases organize data in some manner, but a homoiconic database is unique in that various aggregations of its components (described hereinbelow) constitute an executable application. While many databases have some internal scripting language (e.g., embedded procedures), the instant technology takes this a step further in that the actual nodes of the framework contain executable code or references to one (written in a suitable programming language or languages) as well as actual data. The homoiconic property described by Kay (1969) states that the data and the program are one and the same thing. While the principle of homoiconicity has been used widely in implementing computer languages, such as Smalltalk, PROLOG, and LISP, its use in the context of a graph database is a novel aspect of this invention.

An executable graph is one in which the nodes—because instructions are associated with them—can be executed to produce an aggregate effect or outcome of executing the graph. Thus, the execution may start at one or more nodes, for example simultaneously so that more than one execution thread can run in parallel, and the execution threads propagate to the other nodes upon execution. The graph structure, including the executable instructions at the various nodes, provides one or more paths through the graph to define the sequence in which instructions are executed. Thus, the executable graph, when executed, can provide for execution of one or more processes simultaneously. When multiple graphs are connected to one another, there are a number of possibilities for the process flow. In some embodiments, the process flow travels from one graph to another, as would be a natural way to represent, for example, a streaming process as encountered in image data processing pipelines. In other embodiments, the separate graphs can be executed independently of one another, such as concurrently, as with, for example, a small-scale electrical grid application (commonly referred to as a microgrid) where multiple control systems embodied in autonomous edge devices (heating systems, batteries, etc.) are operating concurrently, making their own operating decisions.

In the present invention, the basic building block or node of an executable graph is called an "entity". Entities are combined in a hierarchal, single-parented, directed acyclic graph (DAG) with a topmost node referred to as the "apex". All apex nodes share the same behavior and differ only in the manner by which they are linked into the executable graph. The apex entity has a single child entity referred to as the "top node". Below the top node is a multi-parented hierarchy of nodes to an arbitrary depth. All nodes including the top node can have assigned arbitrary behavior according to type. All nodes of the same type share the same behavior but respond differently according to their context within the executable graph framework. Any entity comprising the hierarchy (with the exception of the apex) can have any number of leaf nodes, which typically have only information content. Taken as a whole, the structure comprised of the apex, the hierarchy of intermediate nodes, down to the leaf nodes is an assembly of entities called an executable tree (or "xTree"). Apex nodes from different executable trees can be mutually connected in a multi-parented, possibly cyclic, graph structure called the plexus. Structure nodes consist of intermediate nodes that connect apex nodes, leaf nodes and other structural nodes. Leaf nodes can have leaf nodes of other executable trees as child entities, but only if that child Leaf is a member of an executable tree that is linked as a parent in the Plexus (see below). The network of interconnected leaf nodes forms a multi-parented, directed, acyclic graph called the Fabric. The entire structure including all of the executable trees, the plexus and the fabric make up the executable graph in its totality. Another executable tree can replace any structural node in a given executable tree, (i.e., nodes that are not the apex, the top node, or a leaf node), thereby giving the executable graph structure a fractal nature that can be extended to any depth. Likewise, an entire executable tree can replace any structural node in another executable tree. In this way the system of systems can be arbitrarily large, and can embody the idea of fractal systems.

An executable graph framework incorporates the following set of characteristics:

All edges between nodes have a semantic meaning that is related only to their position in the structure and cannot be assigned any meaning beyond this contextual meaning.

Simultaneous support of both single parented hierarchical (one to many) and multi-parented non-hierarchical (many to many) linkage among nodes, is governed by a strict set of rules.

A "fractal" nature where the repeating pattern of the framework is similar at all scales (vertical scalability).

Behavior (such as the type of process that is run on a given node) is based on node type, which can be externally modified, thereby changing the behaviors of all nodes of a specific type in the executable graph framework.

Introspective and reflective node content (the graph is capable of—respectively—examining itself and modifying both its content and structure).

The procedural capabilities of the nodes comprising an executable graph framework can be understood by someone skilled in the art as 'declarative, self-referential program elements'. As such, an executable graph framework is agnostic of hardware and operating systems, provided that an external procedural implementation of the internal declarative program elements exist for that particular computer hardware and operating system.

Node properties (entity tags) that can be used for display filtering and processing control, which are governed by strict rules for depth of effect (hierarchical inheritance) and breadth of effect (non-hierarchical scope).

Any node in an executable tree, with the exception of the top node, the apex, or a leaf node, can be associated with a single "asset", which is an object or one or more files, possibly having a proprietary format.

Any executable tree can be connected or linked to another executable tree, via a structural node.

Multi-layered many-to-many interrelationships (referred to herein as plexus and fabric).

Examples of problem types that exhibit these characteristics include, but are not limited to, the four types referenced elsewhere herein: 1) Information management, such as that involved in developing consensus, requirements documents, or referential dependencies; 2) Process flow, where information moves in one direction through the plexus as in information processing pipelines, supply chain management, or product development; 3) Knowledge exploitation, including the areas of big data analytics, data mining, and large scale distributed modeling and simulation; and 4) Adaptive collaborative automation, including collaborative robotics, distributed adaptive control processes, and distributed complex systems of systems such as the Internet of Things (IoT). Together these four problem spaces comprise the technology stack and required technologies to manage a system such as the IoT, as shown in FIG. 1.

The technology is distinguished from other frameworks by a set of strict rules that are important and unique to it. The strict rules imposed on the framework and its structural elements are optimized with respect to its intended applications and provide one aspect of novelty. In particular, for each of the three principal graph structures from which the technology is comprised, the plexus, the fabric, and the structural nodes, the edges (links) have one and only one meaning. For the plexus, the edges between nodes (apexes of the executable trees) represent the semantic relationship "influences". Each node can be connected to its children (if any) by edges that assign the semantic relationship "is a child of". Similarly, each node includes a single edge connection to the apex (the topmost node in a hierarchy), which represents the semantic meaning "is the primordial ancestor of". For the fabric, the semantic meaning of all edges that relate leaf nodes of the executable tree is "influenced by". Similarly, when connecting two xGraph systems, a node representing another system, often on another computer, also has the semantic meaning of "influenced by".

The major elements of a preferred embodiment of the technology are:
- A plurality of entities (or nodes): atomic entities of the framework;
- One or more executable trees: hierarchical linked structure of elements;
- Fabric: multi-parented hierarchy of linked structure of leaf elements;
- Plexus: multi-parented hierarchy of linked structure of structures; and
- Visual Information Manager In some embodiments, the graph framework incorporates a virtualizer (for example, created by an application programmer), such that the virtualizer understands the data and relational schema from the underlying data and can generate the node structure.

Entity (or Node)

An entity is the "atomic element" of the executable graph, i.e., the smallest indivisible component of the framework. Every node is manifested as an entity, which has well defined capabilities and interfaces. A node is a mathematical term for the vertices in a graph; within an operational context the node is typically referred to as an entity. Although the terms node and entity are sometimes used interchangeably herein, a node typically refers to a structural context (connectivity with respect to other nodes), whereas the term entity encompasses the underlying processes controlled by the node. A schematic diagram of an entity is shown in the FIG. 2. Every entity (node) can be related to zero or more child entities as shown by the solid arrows at the bottom of the figure. These links can be represented as a list of globally unique identifiers, or GUID's, as described later in this section. Unlike most graph database implementations, these links are neutral and semantic free—their only meaning is contextual in that one node is related to another as "child of", with no other attributed meaning. The semantic-free nature of these links is another important and distinguishing feature of the invention.

All entities have a common base class such that all have a common set of behaviors that can be expected to be present and that can be referenced from external entities. For strict object oriented languages, this takes the form of an opaque interface, with which one skilled in the art is familiar. For other languages, there is still a common base class, although in this case the referencing is by discovery of the methods of the entity through direct interrogation.

Entity Tags

Figure 2:
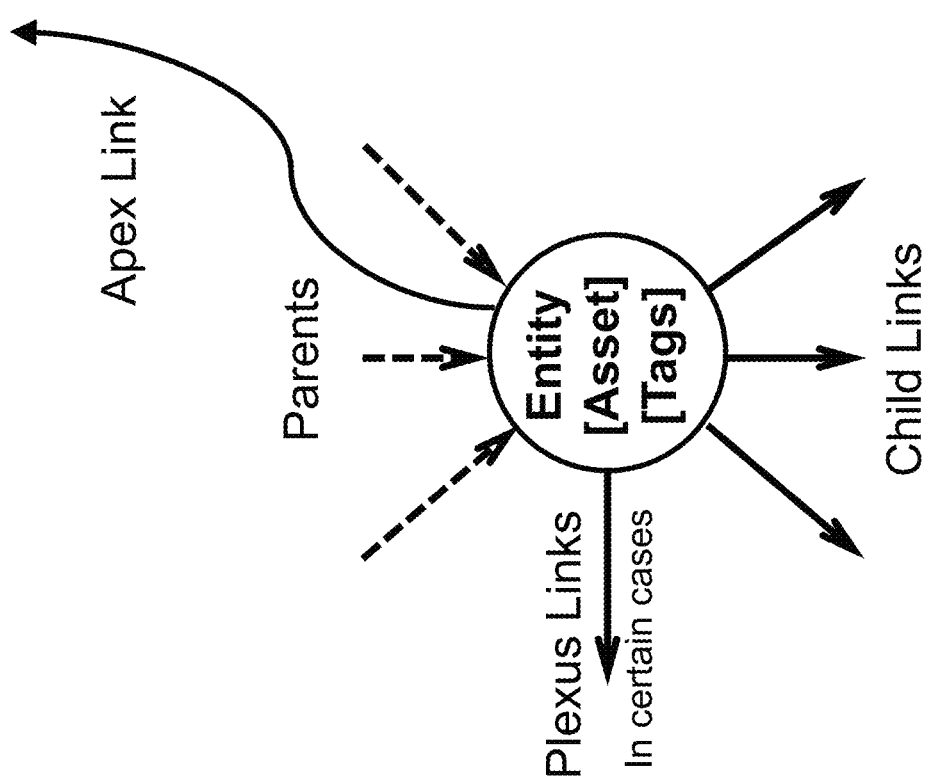
FIG. 2: An entity, in the general case.

For entities, there is another novel and unique aspect of the invention that is represented in FIG. 2 as [Tags]. Tags are short text strings that play an "information magnet" role in applications based on the technology. They are assigned by users or the application itself and can be associated with any node. Tags play an important role in establishing the many-to-many relationships between associated entities. Tags are the basis of filtering and the reductive synthesis operations that can be needed as large volumes of unstructured data are integrated into an easily assimilable form. All elements in an executable tree inherit the Tags of their parents, and by extension, their parents' parents.

Assets

Any entity can be associated with a single asset, which is a file or document that is directly related to the entity with which it is associated. For example, an asset document may take the form of a document produced by any of the word processing programs known in the art, an image file, or any other single document in any arbitrary or proprietary format. In other embodiments, an asset can be a file having another format such as audio, video, or graphic (such as JPEG).

Entity Links

There is also a bundle of links shown in FIG. 2 that represent links to parent entities from the child entity. This would at first seem like a conflict to a previous statement that only links outward to a child entity are retained in the graph. An important and novel feature of the technology is that these links back to the parents of an entity are ephemeral and only available when an entity has been integrated into an executing application. In that event, and only then, can an entity have knowledge of its parents, but these links do not persist when execution is terminated. An entity in its persistent form (data store) does not have any knowledge about what other entities might reference it. It only has information about entities that it has direct links to.

Finally, there is one other link shown in the entity schematic FIG. 2 and represented by a curvilinear arrow. This link is to the apex node of the executable tree in which the entity was created. The executable tree is described further hereinbelow. As is further described herein, in some embodiments, a node optionally has a link to a second executable graph.

Discoverable Entity Interfaces

All entities can have specialized behavior that is discoverable by other entities making up the executable graph framework. This behavior may arise from the programming language with which the executable graph is implemented. For some language bindings such as Java or C++, these behaviors are manifested as "opaque interfaces", one being the interface that is used to discover other behaviors, also in the form of opaque interfaces. For other languages, the process of discovery is more direct. For example, a JavaScript or Node.js implementation would involve the direct interrogation of the methods of the object to see if it supports the desired behavior.

Unique Identification Entities

An important defining attribute of the design of the technology is that it be horizontally scalable and extensible to large, enterprise-wide, applications. The design optimizes this in a novel manner by imposing a severe limit on features, selecting the smallest set necessary to attain the desired capability. The most important requirements for achieving this level of scalability are 1) extensibility, 2) multi-user collaboration, and 3) ability to run in a "cloud" environment without a centralized controller. To provide a multi-user, distributed, collaboration, it is necessary that various users with no direct communication must be able to create and modify entities and connect them or disconnect them as appropriate without the scaling issues associated with a central server—something that has been the bane of relational databases, sharding notwithstanding.

Every entity has properties, some of which are common to all entities, while others are unique to entities of a particular type and are thus application dependent. Examples of the shared properties include a globally unique identifier (GUID), the list of other entities that are directly linked (consisting of a list of GUID's), an entity type, a title, and a brief text description of the role that a particularly entity plays within a particular instantiation within an executable graph. The GUID is an identifier comprising a string of characters whose likelihood of being repeated is astronomically small. In some embodiments, this is a string of 32 hexadecimal characters (0-F), although the particular choice of the GUID structure is not a defining aspect of the invention.

Other properties vary between entity types. For example, an entity representing information excerpted from a document might also have properties that are located within the structure of the document the excerpt was taken from. In another example, an entity representing an earthquake hypocenter might have properties that give the, latitude, longitude, and depth of the event, as well as its magnitude.

While applying the executable graph technology to a particular task or application, the implementer is free to create as many unique entity types as deemed appropriate, and to assign each unique type any properties beyond those shared by all, as needed to support the requirements of the particular application.

Executable Tree: Hierarchical Structure

Figure 3:
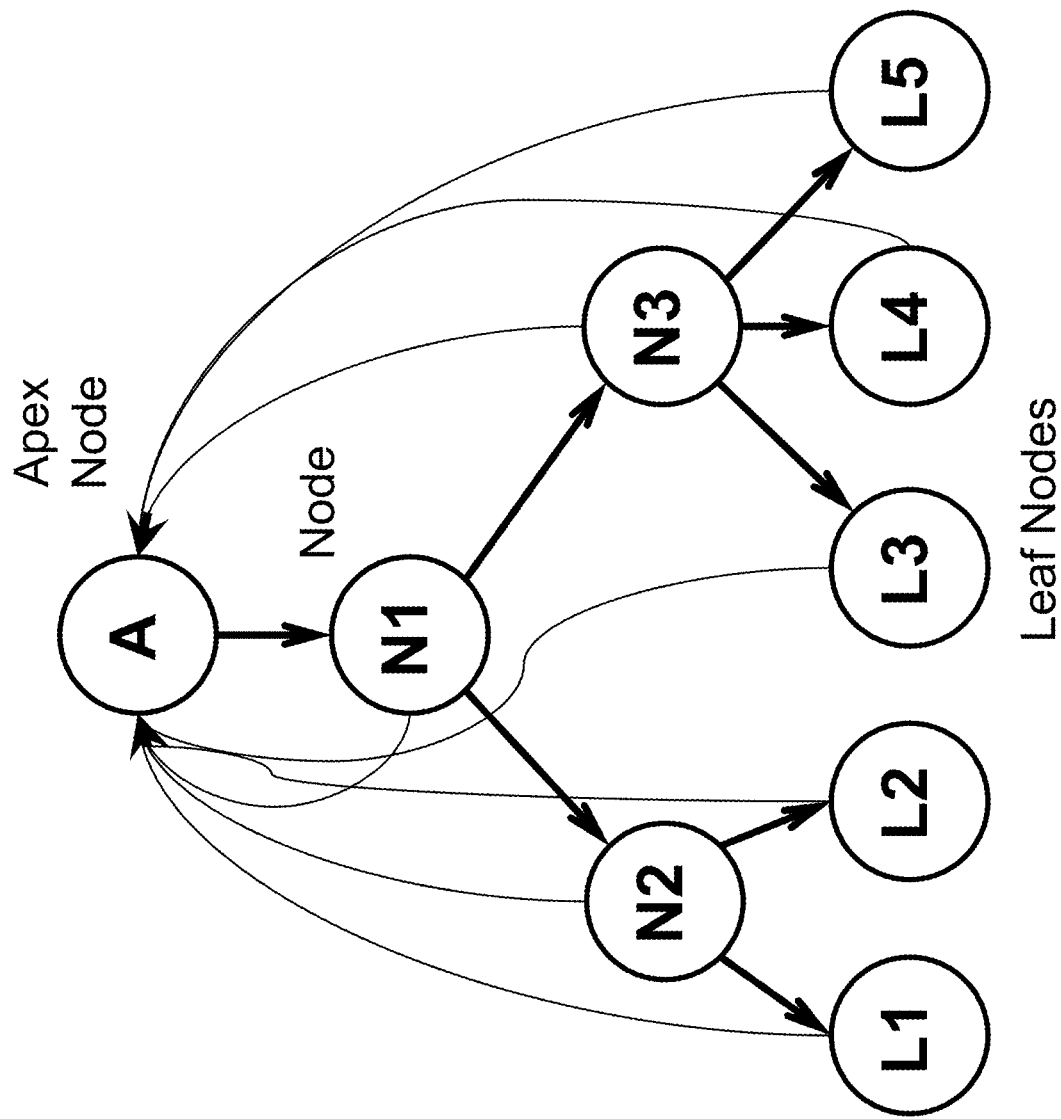
FIG. 3: Basic executable tree (Arrows denote 'child of', for example N2 is a child of N1).
Figure 4:
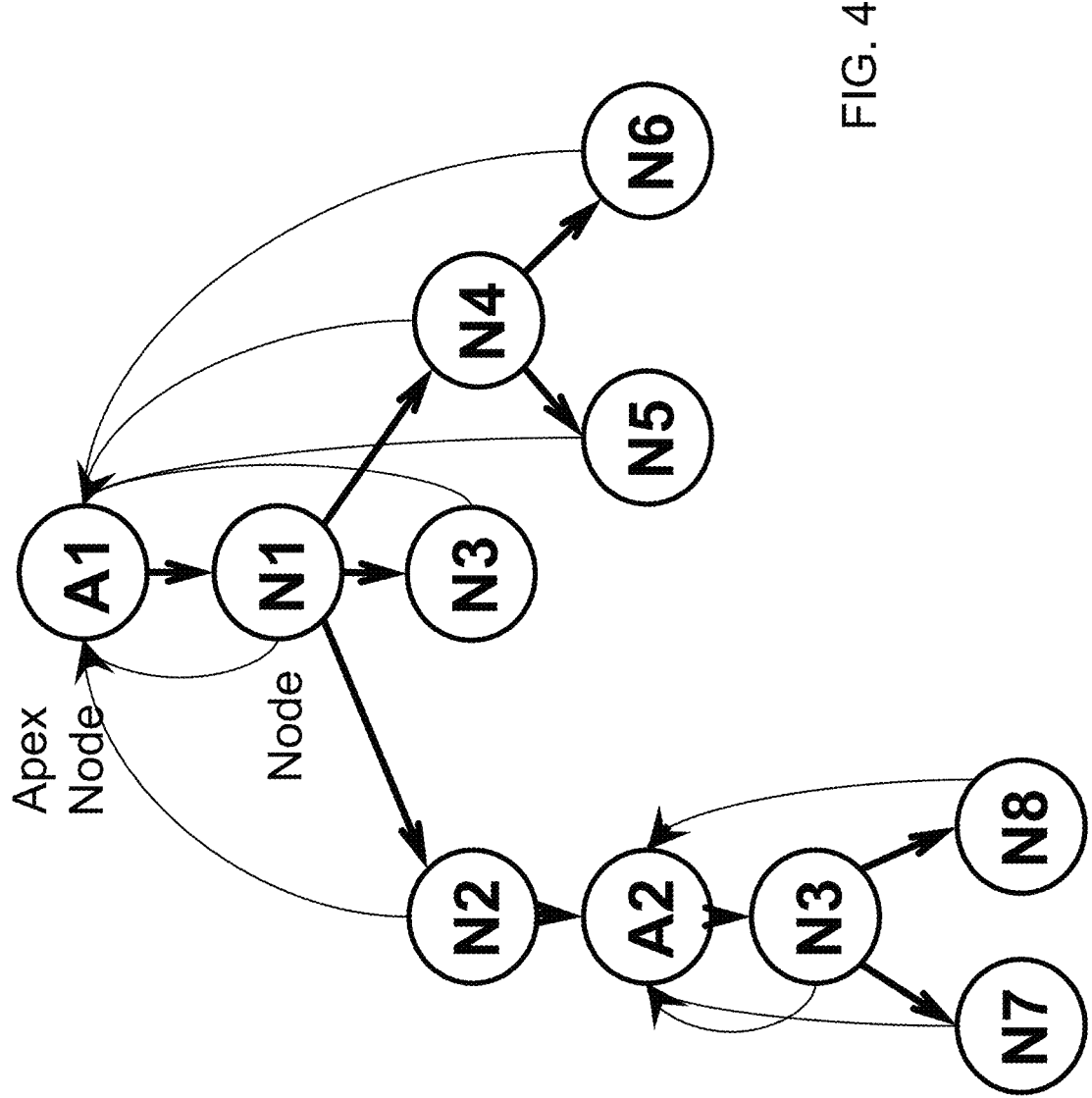
FIG. 4: Fractal nature of executable graph.

The arrows in FIG. 2 and FIG. 3 indicate certain types of relationships that exist between entities. Unlike its cousin, the graph database, the links in an executable graph have only one semantic meaning based on their role in defining the structural relationships. For example, in the diagrams, the "Child Links" point to child Entities in all cases. The dashed arrows above the entity in FIG. 2 are not part of the entity, but they are the child links of its parents. They are discoverable when the executable graph is active, but not present in the static data representations when the executable graph is not operational. The horizontal arrow on the left represents a sibling relationship and is only present in entities of the apex class. In some expressions, it is bidirectional, and in others it is unidirectional, again depending on the application. Finally the curvy arrow is a special link where each node "knows" of its primordial parent, which is always a node of the Apex class. These relationships can be summarized in what are called rules. These are:

1) An apex (A) can have sibling links, and has exactly one child link to a structural node (N).
2) A structural node (N) can have any number of child links to other nodes (N) or leaves (L). It also has one and only one apex Link.
3) A leaf node (L) can only have child links to other leaf nodes, but only to those in a different executable tree as described below. It has links to one or more parent nodes, as well as one and only one link to its primordial apex.
4) An apex—and hence an executable graph to which it points—can be integrated into an executable graph framework as a structural node, or as a child of an arbitrary number of (N) parents. Examples of such connections are shown in FIGS. 4-6 and are further described hereinbelow.

Using these rules, the nodes of an executable graph are organized hierarchal structures, together called an executable tree as shown in FIG. 3. An executable tree comprises an apex (A), any number of structural nodes (N), and some or no leaf nodes. Here the solid lines show the "child links", and the light lines show the "apex links". While only two node layers are shown, a node (N) can have any number of child links, and leaf nodes can appear anywhere in the tree as a child of a node. A node can manifest complex behavior relating to its immediate relationships between parents, children, and its apex node. The apex is where the capabilities of one executable tree are coordinated with another using a communications protocol which varies with the application.

A unique aspect of an executable graph structure that makes it a novel and unique approach to replicating the structural relationships found in complex systems (previously known as systems of systems), is that an executable graph is intrinsically fractal in nature. This property follows from the fourth rule, that an apex (A) can mimic a node (N) in the executable graph framework of entities. This is illustrated in FIG. 4, which shows an executable tree rooted at apex A2 that is serving as a child entity of N2. The structure, in this fashion, is arbitrarily nested, in that executable trees, can be embedded in executable trees, which can themselves be embedded in executable trees, and so forth. Frameworks that do not share this fractal nature, cannot be used effectively to model complex systems.

Figure 5:
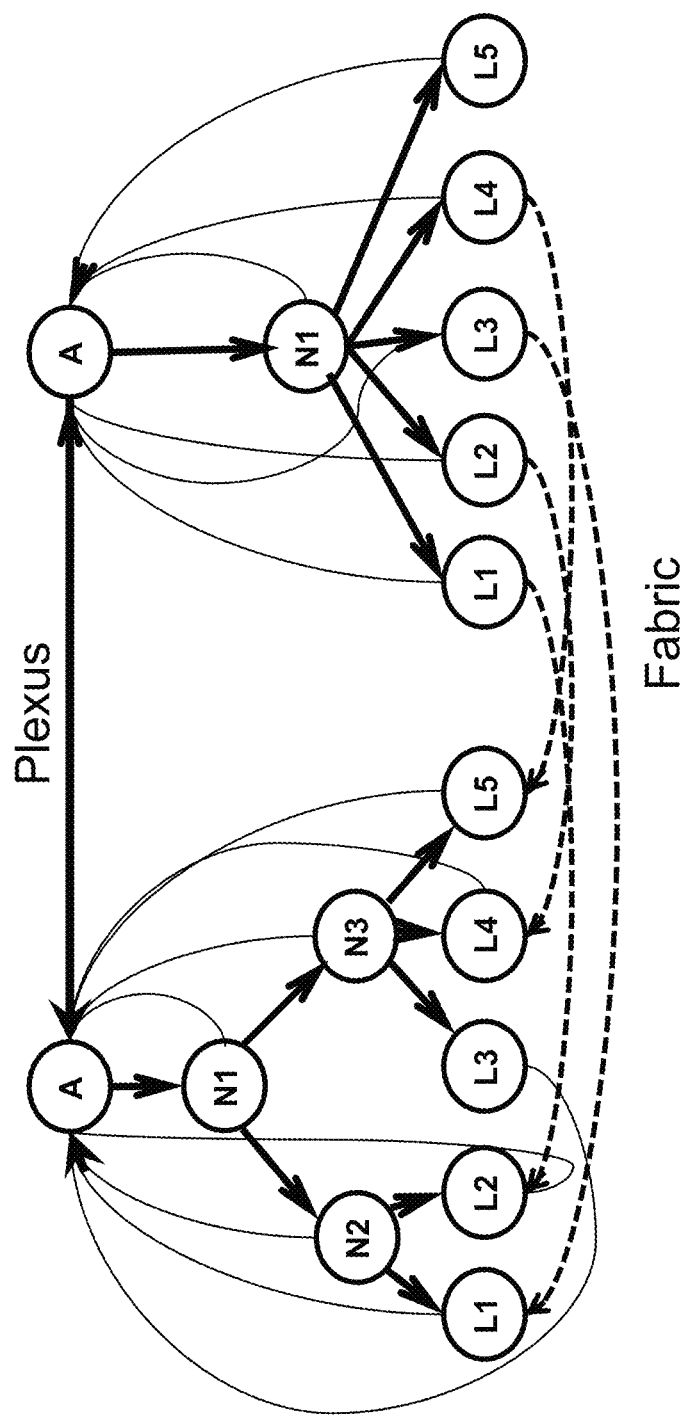
FIG. 5: Executable graph framework.
Figure 6:
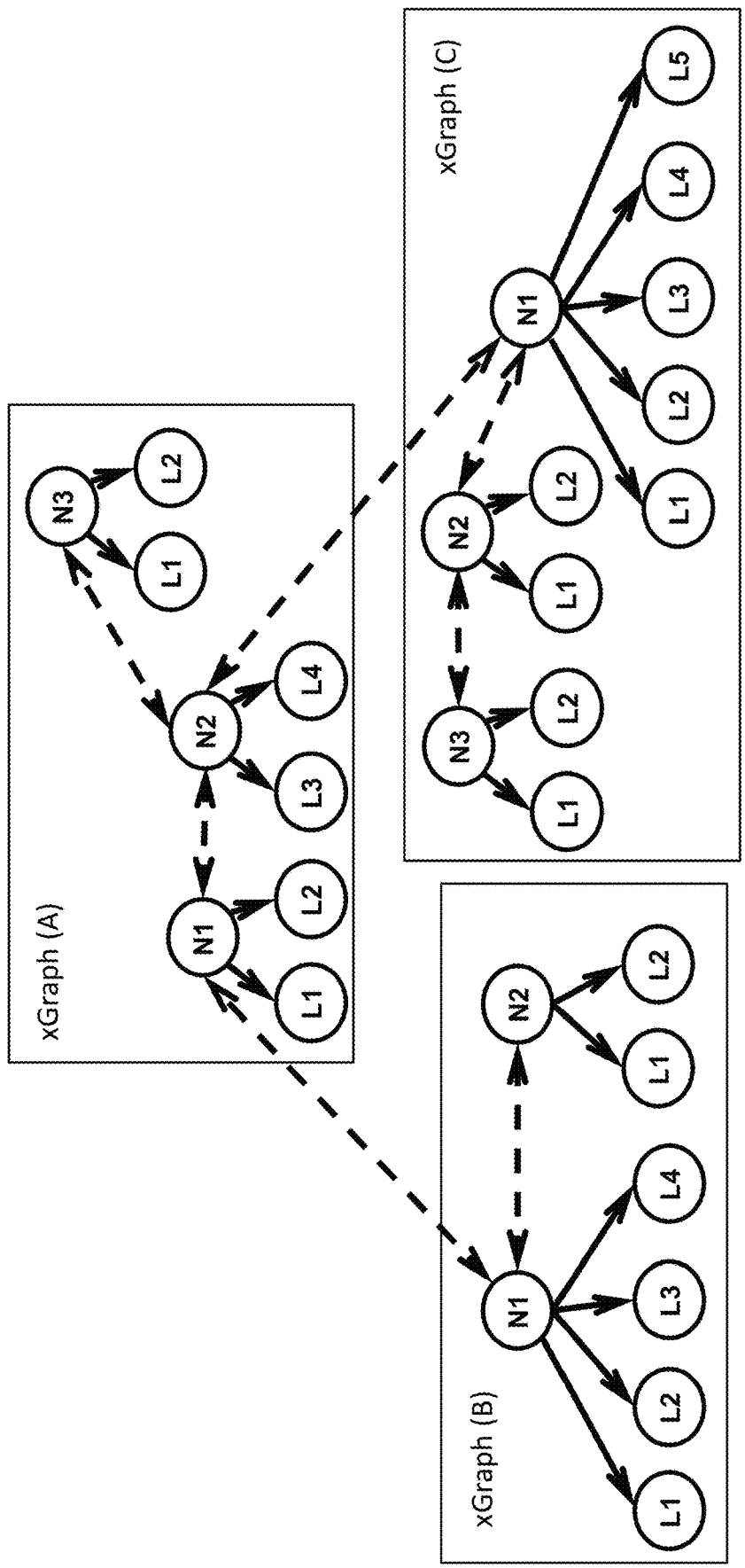
FIG. 6: Multiple executable graphs connecting to one another.

A layer of executable graph framework (or plexus as described hereinbelow) is defined by the relationship between collaborating executable trees, as shown in FIG. 5. This shows the (A) to (A) relationship between executable trees. The network of these connections is referred to as the plexus layer. The dashed arrows at the bottom show how the L nodes of one executable tree can be linked to those of another. Which leaves (L) are candidates for this connection is application dependent, but in general an L node can only be connected to an executable tree when the A nodes of that executable tree are connected directly in the Plexus layer. This layer of the executable graph is called the "fabric" layer, and includes any leafs that are interconnected with other leaf nodes.

A fractal layer of multiple xGraphs (executable graph framework) is defined by the relationship between collaborating xGraph's, an example of which is shown in FIG. 6. This shows a relationship between executable xGraphs. The dashed arrows show how one xGraph can function as a node in another xGraph. Node N1 of xGraph (B) functions as a node in xGraph (A); similarly, xGraph (C) functions as a node of xGraph (A). These xGraphs can be computationally distinct, such as running on separate machines, distinct in geography, and even comprising different computer languages or processors. This distributed aspect is an important benefit of being able to link multiple executable graphs to one another.

The various nodes comprising an executable graph communicate along the relationships represented as arrows in the figures using a content addressable protocol. Messages can move between executable trees along the arrows that comprise the plexus, which means that an entity in one executable tree can communicate with another in an executable tree that is related to its primordial parent through a post or prior relationship in the Plexus. Also, because messages flow down through the child links within a structure, any entity in an executable tree can communicate directly with any other entity in the same executable tree. There are a number of well-defined content addressable messaging protocols, such as SOAP, XML, and JSON. Most modern collaborative frameworks seem to be moving towards JSON (JavaScript Object Notation) as the content messaging protocol of choice, although the choice of protocol is not a defining aspect of the executable graph framework.

Plexus and Fabric: Non-Hierarchical Structures

The Plexus is the complete description of the overall structure of the executable graph—it is the manner by which various executable trees are related that represents aggregate information and code dependencies in a manner that is unique to this invention. The Plexus comprises the network relationships that connect apex nodes of disparate executable trees in the context of the Internet of Things. Thus, the Plexus is a structure of structures. The fabric is a network of unidirectional edges that connect leaf nodes of separate executable trees. Relative to a given instance of an executable tree, all the other trees in the executable graph are considered as alien executable trees. An alien executable tree that is linked as a parent through the Plexus to the instance of an executable tree is known as a "prior", and an alien executable tree that is linked as a child through the Plexus is known as "post". Together, the Plexus and the fabric constitute two layers, the Plexus being a top plane of apexes (structure of structures) and the fabric comprising a bottom layer of leaves. The structure nodes or entities between the Plexus and the Fabric can only have direct links within the executable tree to which they are a part, although they may interrogate and communicate directly with any other entity in the executable graph framework either indirectly by communications through the Apex, or directly through methods implemented in the entities themselves. This structure is unique to this invention and is important for the plurality of applications that the executable graph framework is intended to support.

The fabric is the set of the links between the leaf nodes of different executable trees that make up the executable graph. Only leaf nodes can be linked as part of the fabric. FIG. 5 shows these fabric links as broken curvy arrows at the base of the graph. Child links for a leaf node can only exist through the fabric between a leaf and any number of nodes of a directly linked prior executable tree. Only a leaf node can be connected to a leaf of an alien executable tree in this manner.

Implementational Details

The methods described herein are preferably implemented on one or more computer systems, and the implementation is within the capability of those skilled in the art. In particular, the computer functions for manipulations of graph elements can be developed by a programmer skilled in the art. The functions can be implemented in a number and variety of programming languages including, in some cases, mixed implementations (i.e., relying on separate portions written in more than one computing language suitably configured to communicate with one another). The present invention supports implementations in a variety of languages including strict object oriented languages e.g., C++ or Java) as well as more loosely object oriented languages (e.g., JavaScript or Node.js). In general, the functions, as well as any required scripting functions, can be programmed in C, C++, Java, JavaScript, VisualBasic, Tcl/Tk, Python, Perl, .Net languages such as C#, and other equivalent languages.

The capability of the technology is not limited by or dependent on the underlying programming language used for implementation or control of access to the basic functions. Alternatively, the functionality can be implemented from higher level functions such as tool-kits that rely on previously developed functions for manipulating graph elements.

Where two or more parties separately and independently perform computations, such as graph manipulations on the same data or executable programs, it is to be assumed that each party independently has access to a computer system that has the capability described herein, even though the various computer systems operated by the various parties need not be identical to one another in power or in the precise details of the manner in which they are programmed.

The technology herein can be developed to run with any of the well-known computer operating systems in use today, as well as others not listed herein. Those operating systems include, but are not limited to: Windows (including variants such as Windows XP, Windows95, Windows2000, Windows Vista, Windows 7, and Windows 8 (including various updates known as Windows 8.1, etc.), Windows 9, and Windows 10, available from Microsoft Corporation); Apple iOS (including variants such as iOS3, iOS4, and iOS5, iOS6, iOS7, iOS8, and intervening updates to the same); Apple Macintosh operating systems such as OS9, OS 10.x, OS X (including variants known as "Leopard", "Snow Leopard", "Mountain Lion", "Lion", "Tiger", "Panther", "Jaguar", "Puma", "Cheetah", "Mavericks", and "Yosemite"; the UNIX operating system (e.g., Berkeley Standard version) and variants such as IRIX, ULTRIX, and AIX; and the Linux operating system (e.g., available from Red Hat Computing).

To the extent that a given implementation relies on other software components, already implemented, such as functions for applying graph theoretic operations, those functions can be assumed to be accessible to a programmer of skill in the art.

Furthermore, it is to be understood that the executable instructions that cause a suitably-programmed computer to execute methods for managing information, as described herein, can be stored and delivered in any suitable computer-readable format. This can include, but is not limited to, a portable readable drive, such as a large capacity "hard-drive", or a "pen-drive", such as can be connected to a computer's USB port, and an internal drive to a computer, and a CD-Rom, or an optical disk. It is further to be understood that while the executable instructions can be stored on a portable computer-readable medium and delivered in such tangible form to a purchaser or user, the executable instructions can be downloaded from a remote location to the user's computer, such as via an Internet connection which itself may rely in part on a wireless technology such as WiFi. Such an aspect of the technology does not imply that the executable instructions take the form of a signal or other non-tangible embodiment. The executable instructions may also be executed as part of a "virtual machine" implementation.

Computing Apparatus

Figure 7:
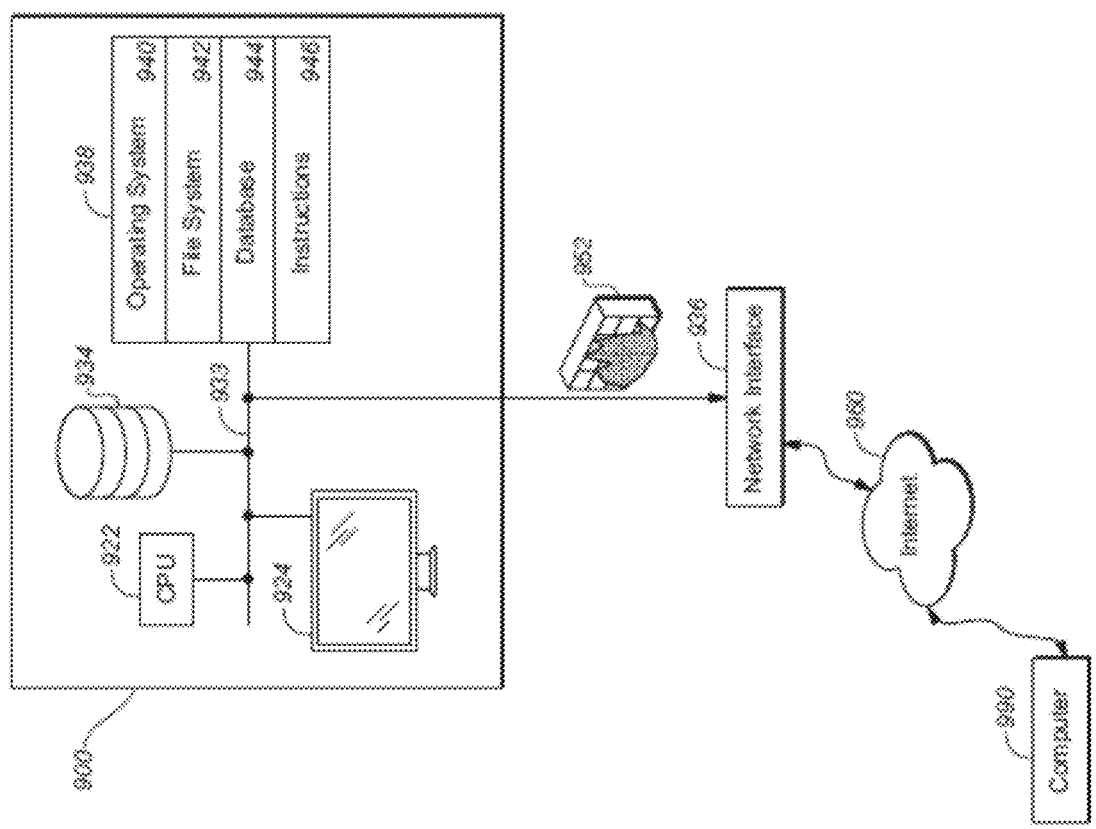
FIG. 7: Exemplary computer system implementation.

An exemplary general-purpose computing apparatus (900) suitable for practicing methods described herein is depicted schematically in FIG. 7. Such a system could be used by any user who wishes to manage information as described herein.

The computer system (900) comprises at least one data processing unit (CPU) (922), a memory (938), which will typically include both high speed random access memory as well as non-volatile memory (such as one or more magnetic disk drives), a user interface (924), one more disks (934), and at least one network connection (936) or other communication interface for communicating with other computers over a network, including the Internet (960), as well as other devices, such as via a high speed networking cable, or a wireless connection. Network connection (936) can be used to access information using another computer system (990) (not shown) having similar capability to that computer system (900) and able to receive data to be shared from computer (900). There may optionally be a firewall (952) between the computer (900) and the Internet (960). At least the CPU (922), memory (938), user interface (924), disk (934) and network interface (936), communicate with one another via at least one communication bus (933).

Memory (938) stores procedures and data, typically including some or all of: an operating system (940) for providing basic system services; one or more application programs, such as a parser routine (950), and a compiler (not shown in FIG. 7), a file system (942), one or more databases (944) that store data such as architectural or seismological data, and optionally a floating point coprocessor where necessary for carrying out high level mathematical operations such as for carrying out graph theoretic operations. The methods of the present technology may also draw upon functions contained in one or more dynamically linked libraries, not shown in FIG. 7, but stored either in memory (938), or on disk (934).

The database and other routines that are shown in FIG. 7 as stored in memory (938) may instead, optionally, be stored on disk (934) where the amount of data in the database is too great to be efficiently stored in memory (938). The database may also instead, or in part, be stored on one or more remote computers that communicate with computer system (900) through network interface (936), according to methods as described in the Examples herein.

Memory (938) is encoded with instructions (946) for at least: carrying out graph theoretic operations. The instructions can further include programmed instructions for performing other operations, as desired. In many embodiments, the information itself is not generated on the computer (900) that performs the graph theoretic manipulations but are generated on a different computer (not shown) and, e.g., transferred via network interface (936) to computer (900).

Various implementations of the technology herein can be contemplated, particularly as performed on one or more computing apparatuses (machines that can be programmed to perform arithmetic) of varying complexity, including, without limitation, workstations, PC's, laptops, notebooks, tablets, netbooks, and other mobile computing devices, including cell-phones, mobile phones, and personal digital assistants. The methods herein may further be susceptible to performance on quantum computers. The computing devices can have suitably configured processors, including, without limitation, graphics processors and math coprocessors, for running software that carries out the methods herein. In addition, certain computing functions are typically distributed across more than one computer so that, for example, one computer accepts input and instructions, and a second or additional computers receive the instructions via a network connection and carry out the processing at a remote location, and optionally communicate results or output back to the first computer.

Control of the computing apparatuses can be via a user interface (924), which may comprise a display, mouse, keyboard, and/or other items not shown in FIG. 7, such as a track-pad, track-ball, touch-screen, stylus, speech-recognition device, gesture-recognition technology, human fingerprint reader, or other input such as based on a user's eye-movement, or any subcombination or combination of inputs thereof.

The manner of operation of the technology, when reduced to an embodiment as one or more software modules, functions, or subroutines, can be in a batch-mode—as on a stored database processed in batches, or by interaction with a user who inputs specific instructions. In many embodiments, the user can interact with the programs via a web-browser.

The representations created by the technology herein, as well as the information itself, can be displayed in tangible form, such as on one or more computer displays, such as a monitor, laptop display, or the screen of a tablet, notebook, netbook, or cellular phone. The representations, can further be printed to paper form, stored as electronic files in a format for saving on a computer-readable medium or for transferring or sharing between computers, or projected onto a screen of an auditorium such as during a presentation.

Certain default settings can be built in to a computer-implementation, but the user can be given as much choice as he or she desires over the features that are used in operating on the information.

EXAMPLES

The following examples illustrate various implementations and embodiments of the executable graph framework.

Example 1

Information Management

The "Information Management" space refers to those applications of the executable graph framework where the static relationships between pieces of information (each represented by a leaf node) combine to support some decision-making or consensus-building process. In this space, all of the possible relationships described above exist, although the plexus layer is restricted in a specific way.

Typical applications in this space manifest dynamic structure, in that executable trees and nodes are added during the analysis, and the data is entered as it becomes available.

Possible embodiments in this space include but are not limited to: finding a consensus set of requirements by integrating the opinions and desires of multiple stakeholders as in the fields of architectural programming, authoring a scientific paper, optimization of an enterprise architectural framework, finding a consensus set of requirements by integrating the opinions and desires of multiple stakeholders, balancing the needs of members of a community in an urban development project, and designing a complex military system that adequately addresses many operational constraints, among others. One of skill in the art would understand that this is not an exhaustive list and that there are many more uses of this invention not specifically listed herein.

In one preferred embodiment, the process called architectural programming or briefing takes as input information harvested from stakeholders, influencers, and controlling documents (e.g., building codes) to create the guidelines used by an architect to design a structure. As with all of the examples described herein, a fundamental value of the executable graph approach arises from its intrinsically homoiconic nature. What this means, in this context, is that the internal (executable graph) representation of the problem matches the external representation. That is, sources of data are represented as sources of data, decision points are represented as decision points, and a compendium of requirements is represented as a compendium of requirements. The executable graph representation of the process exactly matches the real world representation.

Furthermore, in this example, by using the executable graph approach the structure can be dynamically adjusted using a visual information manager (VIM) that allows the introduction of new sources of data, or integration of new decision points, etc., as the information harvested from stakeholders evolves. The VIM allows a user to directly modify the structure of the executable graph by visually manipulating nodes in a 3D environment.

The VIM is a novel aspect of the invention. It makes use of a 3D virtual world engine. Almost all current user interfaces derive from the "windows" paradigm originally developed by Xerox and used in interfaces on both Apple and Microsoft operating systems as well as those available on Linux and in X-Windows. A 3D interface in such a paradigm could be thought of as a "worlds in a window" with menus, ribbon panels, tool trays, and scroll bars. Navigation is often somewhat awkward, sometimes with scroll bars and other times with small, interactive controls to pan, rotate, and zoom the "world in the window".

The interface used with the VIM turns this paradigm inside out, which in and of itself is a rather bold and unique aspect of this part of the invention. The principal paradigm might well be characterized as "windows in a world", which opens up a great deal of space for managing and integrating complex relationships between and among systems of systems. Moving around in the world is quite similar to the very mature navigational interfaces used in virtual online gaming.

Entities can be interrogated in the world by selecting them and opening up a "window in the world" that might contain simple anecdotal data or something more complex as a table of operational parameters or a dynamical performance graph or a program. The advantage of this is that it permits a vastly greater space to work. This unique approach to information management is the basis of a much more effective and modern metaphor for the human-computer interaction.

In this example related to architectural programming, the lowest level executable tree would be similar to what is called a "topic map", which is a hierarchal arrangement of information. In such an application, an executable tree might be referred to as an "information map", or an "infomap". To be more specific, an infomap might be structured to represent all of the information gleaned from a single document, so that the topmost node beneath the apex would have an asset reference to the document. That would be followed by leaf nodes that would be in a one-to-one relationship to direct quotes selected from the document. Another infomap might be a similar structure providing excerpts from a collection of e-mail messages. Both of these would represent the executable trees related to the apexes A1, A2, or A3 in FIG. 8.

In this embodiment, each entity in an executable tree is also associated with a set of relevant tags selected by the user in an appropriate way that one skilled in the art can devise. This is a basic capability of the executable graph entity class that is predominantly used in the information management space, but also can be used in novel ways by one skilled in the art for the other three spaces described elsewhere herein.

Figure 8:
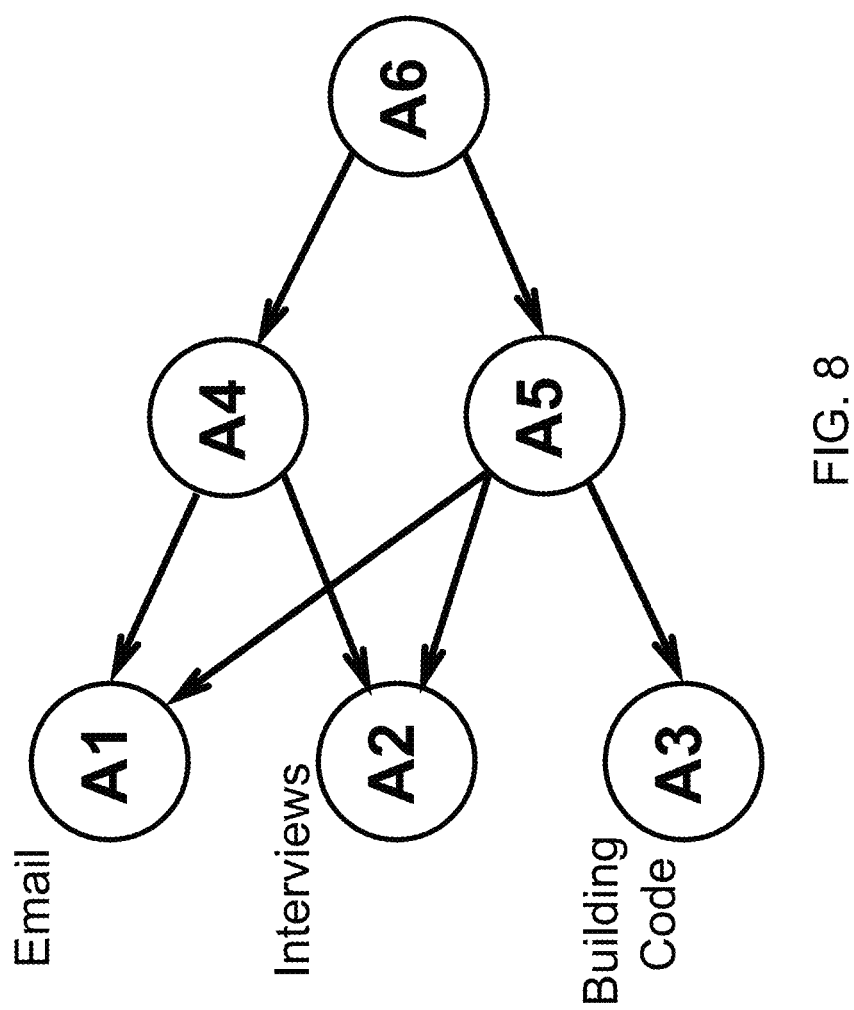
FIG. 8: Example plexus view for information management space. (In this figure, arrows denote "influenced by"; for example, A6 is influenced by A4).

The information consolidation process takes data from various sources, resolves conflicts, and finally creates a consensus set of guidelines for the following design process. FIG. 8 shows a view of the plexus (revealing the relationship of the apexes in the plexus) for a simple example of this process. The three apexes on the left, A1, A2, and A3, represent information sources, e-mails, interviews, and code documents respectively. For the executable tree whose apex is labeled A1, the nodes might represent individual emails, and the leaves might represent excerpts from the e-mail(s) that represent a particular opinion on a specific issue. Similarly, for A3, the nodes might represent individual code documents, and the leaves might represent particular code issues that might influence or constrain the final design. It might seem counter-intuitive that the arrows from right to left represent influence flowing from left to right. The basic idea is that they represent "influenced by" rather than "influences".

During the information integration process, the tagging of elements of the executable graph aid the architect by suggesting to the architect possible meaningful associations, i.e., things that, if missed, can lead to costly retrofits and late stage changes. The invention provides for a way for the user to make connections using the VIM process between leaf nodes of different executable trees. These associations aid the architect in creating cause and effect diagrams of influencers of decisions.

In this example, another kind of infomap that is typical of Information Management space applications is an executable tree that is used to integrate and consolidate information as it moves through the framework to achieve a consensus outcome. In FIG. 8, the executable trees with apexes A4 and A5 would typically be of this type. An executable tree serving as an information integrator would typically comprise a hierarchal structure of structural nodes (N) representing topics and subtopics, and the leaves would represent the resolution of information obtained from a prior, A1, A2, or A3 in FIG. 8. For example, an integration executable tree focused on activities might have sub topics relating to indoor and outdoor activities, which in turn could be subdivided in to particularly types of activities and so forth. During the development of the program or brief, the architect would create new categories as information came in from the various stakeholders, associate the leaves of the activity integration executable tree with all of the information leaves in A1, A2, A3 that are relevant using "tags" to facilitate the aggregation process by suggesting possible associations to the user. The user would then be given the option to modify the text in the integration executable tree's leaves to reflect a consensus or compromise between the various opinions of the stakeholders.

Finally in this example, the apex labeled A6 in FIG. 8 might represent the outline of a final guidelines document, and the N nodes would represent the levels of an outline while the L nodes would contain the various ideas that might frame a paragraph in the final report. This executable tree might be referred to as a "report" and encompasses the characteristics of an integration executable tree as well. The structure of such a report executable tree is similar to that of an integrator in that it is comprised of structure nodes (N) representing a topical outline, while in this case the leaves represent consensual conclusions or guidelines to be integrated into a final report.

Further, in this example, the fabric layer connections allow a process supported by the invention for the tracing of influences in both directions, so that the reason for a requirement can be traced all the way back to primary sources, and the influences that a particular piece of information had on the outcome can be completely revealed as well. Other approaches to this class of problem simply do not and mostly likely cannot provide these capacities. The following description provides a more detailed view of the application of the executable graph framework in the architectural programming process.

Figure 9:
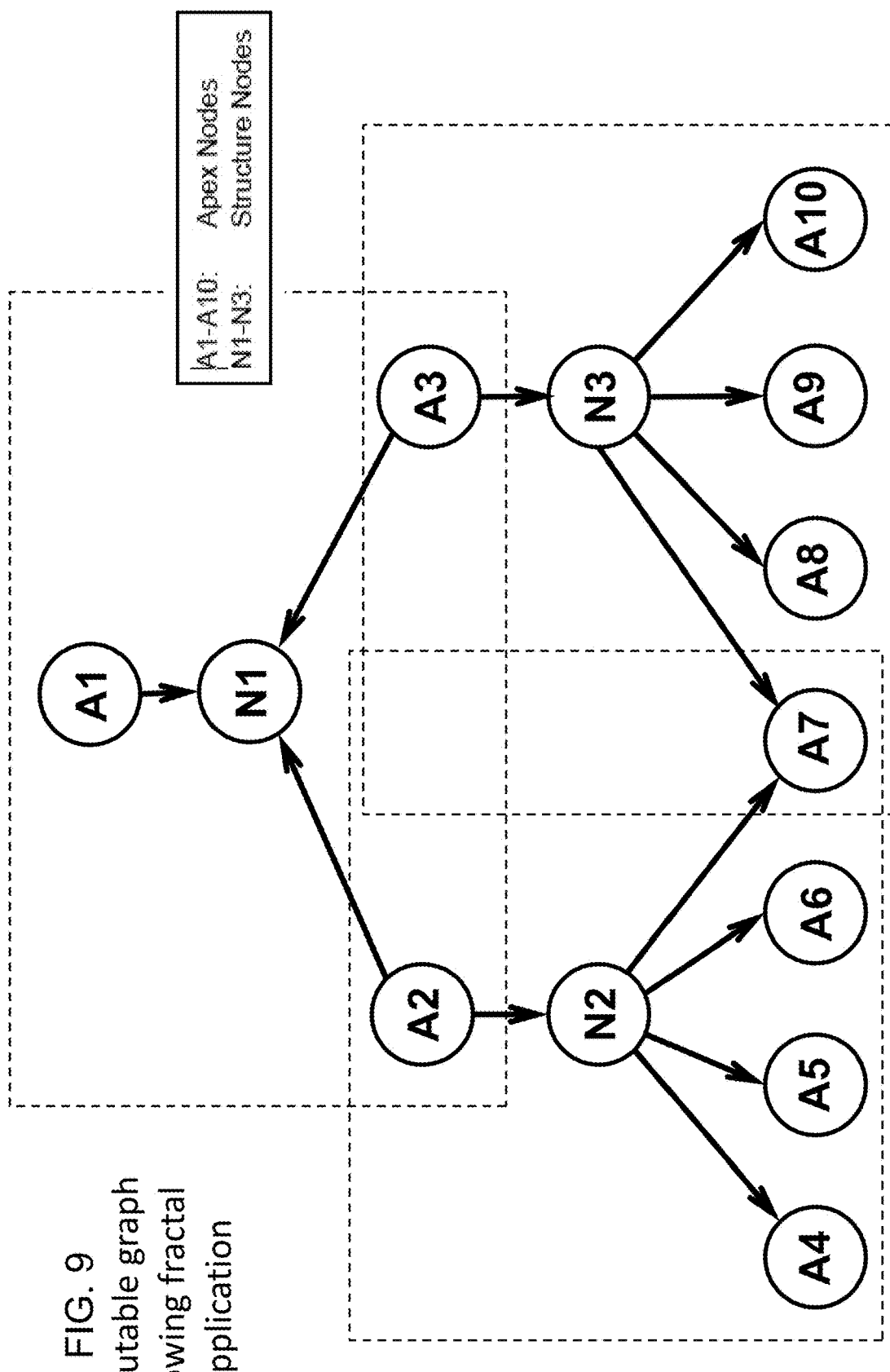
FIG. 9: Executable graph showing fractal application.

However, a busy architectural firm generally has more than one project at any given time. The more successful firms have a rather large portfolio of current and previous projects to draw from. The portfolio is itself another executable tree, with embedded executable trees serving as embedded nodes in that higher level structure. This directly exploits the fractal nature of the executable graph framework. A simple sketch of these relationships is shown in FIG. 9. Here A1 caps an executable tree that includes two building projects with Apexes A2 and A3 revealing the fractal nature of the firm's holdings that must be represented by a framework that includes this capability implicitly. Each of these executable trees is enclosed in a dashed box for emphasis. Taking it to the next level, A4 through A10 are apexes of even more deeply embedded executable trees. Thus, in a way the diagram shows the fractal arrangement of ten nested executable tree objects. Also, note in FIG. 9 that the infomap with apex A7 is shared by two different projects (A2 and A3 via structure nodes N2, N3, respectively). Such an executable tree (A7) could be a local building code that all projects in the firm might reference as a constraint against all building projects in the firm's operational area.

Figure 10:
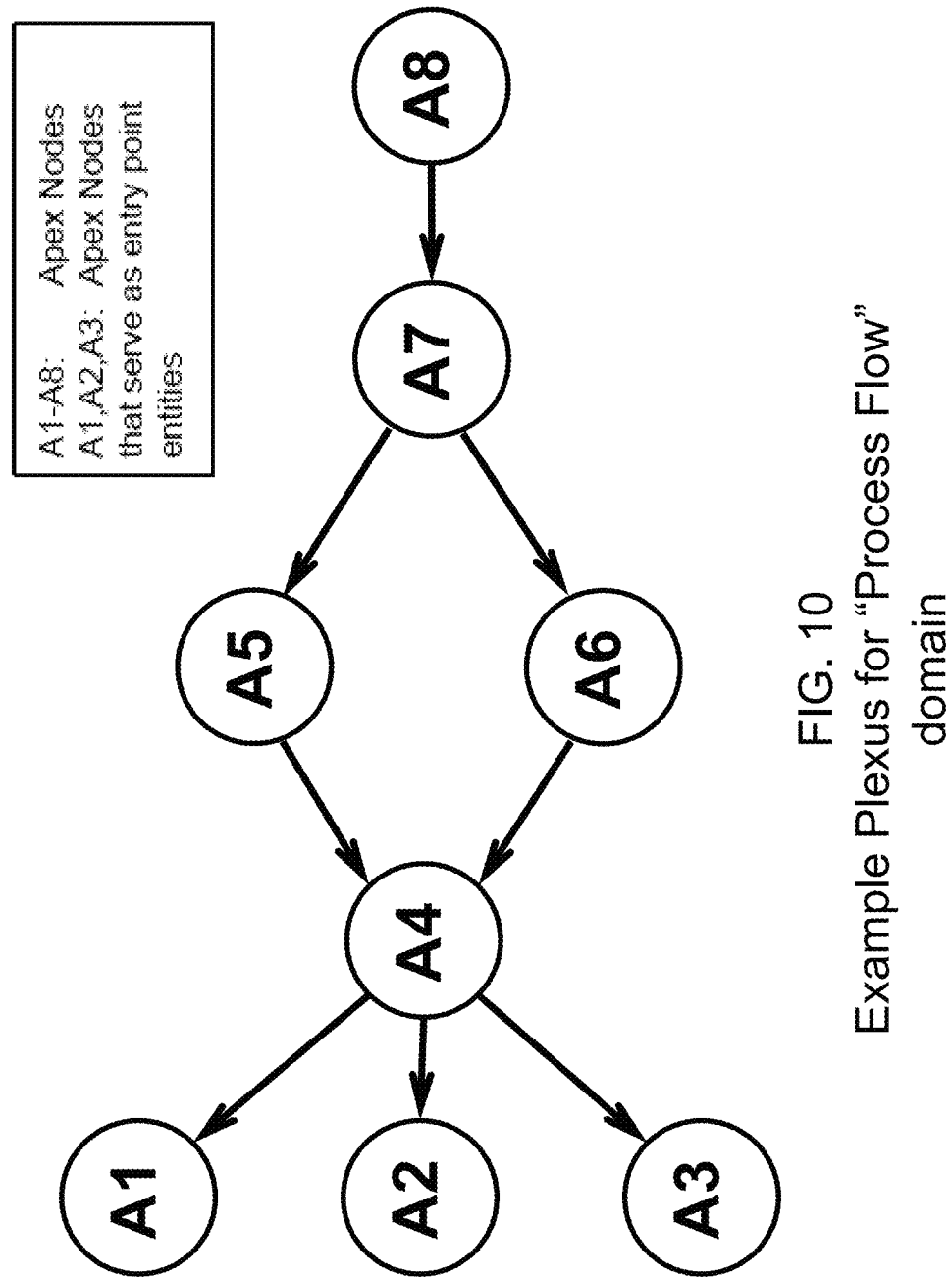
FIG. 10: Example plexus view for process flow space.

In another preferred embodiment in the information management space, the process of authoring a scientific paper represents a use of an executable graph framework. For this purpose, an application of the instant technology by a research scientist would be used to organize the information necessary to support the publication of research papers. In FIG. 10 the simple Plexus view, A1, A2 and A3 would represent three "collection views" for three journal articles or other manuscripts that the scientist considers relevant to several proposed research papers A5 and A6. Since scientists often manifest conflicting interpretations of similar data, an "integration view" step—A4 is used to consolidate and resolve any differences from the researcher's perspective. Finally, the consolidated information from A4 is used as the basis for two papers A5 and A6 or "presentation views" that are submitted to separate journals with differing readership profiles.

The three journal articles represented by A1, A2 and A3 might or might not share a common information structure. In FIG. 10 the node N1 may be a specialized node that understands formats as found in external programs such as Microsoft Word, Open Office Writer, LibreOffice or Adobe Reader to name a few. One skilled in the art will understand that the node labeled N1 can be activated and allow them to highlight portions of the text and assign various tags. The highlighted and commented text can be then incorporated in the text as new child entities of N1. This data can now be used by the integration step A4 of FIG. 10 to resolve any conflicting differences in views in the researchers perspective. One skilled in the art can understand how this process can be extended by the procedures described hereinabove for the architectural programming example.

Another embodiment is for representation and optimization of an "enterprise architectural framework". An enterprise architectural framework represents the interplay of the various operational units, processes, structures and relationships that describe the function of a modern government or commercial enterprise. Current practices fall into one of four categories 1) the Zachman Framework for Enterprise Architecture, 2) the Open Group Architectural Framework (TOGAF), 3) the Federal Enterprise Architecture (FEA), and 4) the Gartner Methodology. An executable graph approach is a much better representation for than current practices in all four of these categories than what else exists today. Current practice maps the enterprise architecture into a complex set of tables in a relational database. The approach using the instant technology is much more appropriate, because an enterprise is a complex, multiply connected structure which is intrinsically fractal and hierarchal in nature, something that a relational approach models and manipulates very poorly. For example, an enterprise often comprises divisions, which comprise project groups, which themselves comprises offices, and so on. The executable graph approach is designed for and ideal for representing, modeling, and optimizing structures of this nature.

City planners and urban developers are daily faced with mountains of documents that record meetings and public opinion. With the technology of the present invention, a planning analyst would use a variety of "collection views", many of which leverage the capabilities of any specialized nodes that understand the formats in the documents represented by the collection views. The information would then flow down a network of cascading integration views to reduce the mountain of unstructured data into something more manageable. Then, to address the issues presented by the various stakeholder groups (committees, public meetings, online polling, Twitter feeds, and much more)onec can use presentation views tailored to each group's needs with the goal of achieving something that resembles consensus as closely as possible within available resources.

DoDAF stands for Department of Defense Architectural Framework, and it is meant to be a comprehensive approach to DoD requirements generation as well as the design and architecting of the resulting complex systems of systems developed by the nation's defense contractors. Unfortunately, in real life, it at present falls far short of this goal, as reported by Vant in a summary of the NATO meeting IST-115 (Vant, M. R., Architecture Definition and Evaluation: Technical Evaluation Report on the NATO Symposium IST-115/RSY-027 Architecture Definition and Evaluation, Toulouse, France, downloaded from http://ftp.rta.nato.int/public/PubFullText/RTO/MP/STO-MP-IST-115///$MP-IST-115-T.pdf).

MODAF, DODAF, DNDAF, NAF, etc., are all architectural frameworks, but lack specific standardized methodology. Each major user chooses their own methodology and tool sets to create the architecture, which leads to further interoperability and collaboration issues, not to mention a steep learning curve for users. A common methodology needs to be developed.

As Vant stated, the tools do not yet exist. The views are defined, and there is a sense that the underlying repository should be based on SysML or something similar. The problem is that there is no connection between the views and the substrate so that the views, which are mainly graphical in nature are constructed with drafting tools and spread sheets. Worse yet, rather than being guiding views, they tend to be created after the fact and become little more than something to add to cost and lengthen delivery times. By contrast, it is a very natural application of the homoiconic graph framework.

DoDAF, as it is defined in its design instruments and descriptions, comprises a list of views related to the perspectives of the various people that need to understand an intended defense system and sign off on it before acquisition can proceed. It is also a vehicle of communication with contractors describing the performance of their offering as related to DoD issued RFPs (Requests for Proposals). DoDAF defines in great detail a number of these views with names like CV-1 Vision, OV-1 High-Level Operational Concept Graphic, or StdV-1 Standards Profile. CV-1 embraces goals, plans, and objectives and would probably be represented as an integration view in an executable graph, and is intended for executive management such as admirals and generals. OV-1 is a view from the perspective of those who actually have to make the systems work in the battle space. StdV-1 would also be an "Integration View" that would be managed by the compliance officers. StdV-1 would have as its priors "collection views" of the technical standards documents that needed to be satisfied. This view is somewhat like those in the "compliance" application described hereinabove.

Example 2

Process Flow

The process flow application space is similar in structure to the information management space, but differs considerably in function. While the structure of the former is dynamic, in the process flow space the structure changes slowly or not at all. Applications in this space process data in a pipeline or production line manner. Examples of such applications include systems for processing earthquake data in real time, supply chain management, or image processing systems and multiple image information fusion systems such as those used for ISR (intelligence, surveillance, and reconnaissance) by military analysts. Typically data or information enters at one end, and a processed result emerges from the other. In this application space, the executable trees represent various processing stages or algorithms that operate on the information as it passes from one stage to the next.

In this example, each such stage represents in some sense a process that imports some aspect of data fusion. FIG. 10 shows a pattern that would represent a typical plexus structure in the application space. The executable tree entities labeled A1, A2, and A3 represent three entry points for information entering the executable graph for processing. Often initial processing takes the form of what might be called "information virtualization" where data that is initially in various forms and formats would be converted into a form that could be understood to the rest of the processing chain.

Figure 11:
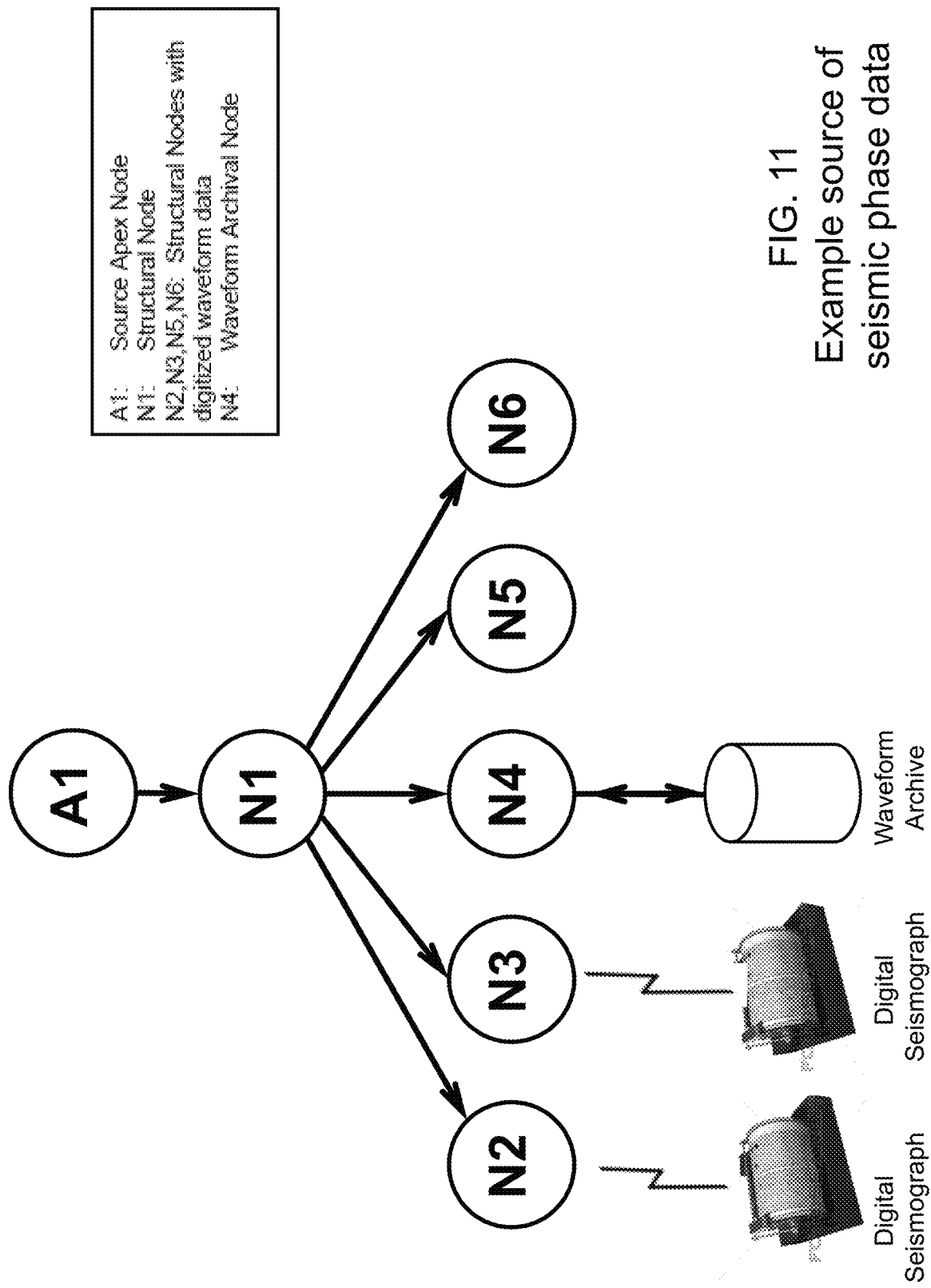
FIG. 11: Example source of seismic phase data for process flow space example.

FIG. 11 shows a possible expression of the executable tree associated with one of the source nodes, A1-A3, in FIG. 8. Here, N2 and N3 represent a computer process that records digitized waveform data transmitted to a recording site via radio link. The digitized waveform data is segmented and transmitted to a central site. From N2 and N3, which are actually just a sample of many more such nodes in a single source executable tree, the data is transmitted to a waveform archival node at N4.

Nodes N5 and N6 represent waveform pickers. As acoustic energy from an earthquake reverberates off the many layers in the Earth, bursts of energy, called phases, are recorded on the seismic waveforms, and the pickers are responsible for detecting these phases, assigning a pick which is the time of the arrival coupled with the location of the sensor in the field that generated the waveform in the first place. The resulting picks, as they are generated by the pickers, are packaged into the appropriate messaging protocol and passed down the chain to the pick associator at A4.

The associator executable tree (A4 in FIG. 10) is a computer process that finds related relationships between picks, and develops a hypothesis location of a possible earthquake. The fractal nature of the associator executable tree is expressed as it dynamically generates possible hypothetical locations, which themselves are represented as executable trees.

Each of A1, A2, and A3 nodes might look something like the executable tree depicted in FIG. 11. This demonstrates the effectiveness of two aspects of the invention. In this example, the homoiconic aspect is represented by the fact that the structure of the executable tree and its structural relationship to the other components mimic the physical structural relationships.

Furthermore, this example shows the adaptive capability is present because, as other executable trees are added, for example during seismic network expansion, they can easily be integrated into a functioning executable graph without disrupting processing. In the example described here, initial processing may be applied to all information as it enters the pipeline (see FIG. 10). These steps are followed by two processes at A5 and A6 that can be applied to the data in parallel. The next stage at A7 might represent a fusing stage where the information from parallel processes is synchronized and then passed to a final stage at A8 where a finished product is delivered. In some sense, this last executable tree reverses the process of the information virtualization seen in A1, A2, and A3 in that the canonical form is reverted into some external format relevant to the user.

As in the first example, the arrows do not show the direction of information. Rather they identify the direction or rather the source from which information is obtained. The executable graph framework invention's value is manifest in the adaptability of the way seismic stations are weighted in relationship to the association process. A form of computational intelligence determines the effectiveness of each individual seismic station and determines the reliability of the data from that site. Seismic stations that consistently produce unassociatable picks are not weighted as heavily as those that consistently supply reliable data, an optimization task that can be performed using introspection and reflective self-optimization. In this case the present invention is an adaptable network of processing which is inherent in the framework.

A specific example of an application in this space might be a sequence of processes that could be used to process raw seismic data into a catalog of relevant earthquakes in real time. Such a system would be used for such things as tracking earthquakes in a volcanic edifice prior to an eruption, locating earthquakes from a global array of seismic sensors to develop an archive of global seismic events, or more locally to track the development of a fracture by locating micro fractures with a dense array for purposes of secondary gas recovery or deep fluid waste injection. For a typical example we focus on the global earthquake catalog application.

Figure 12:
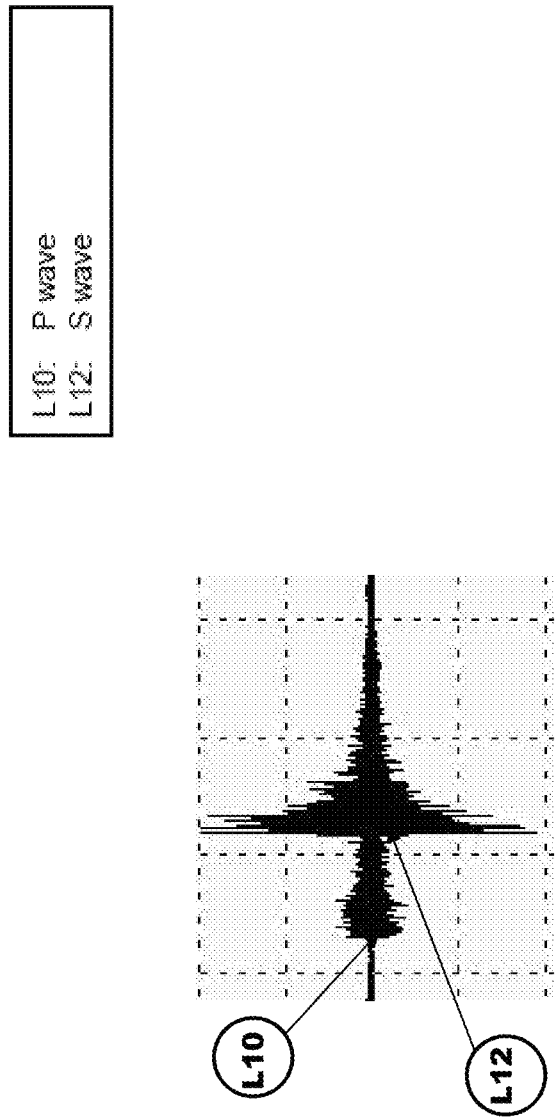
FIG. 12: Digitized seismic record.

For such an earthquake catalog, the input data would take the form of raw seismic information in the form of digitized seismic records from a worldwide distribution of seismic recording devices as shown in FIG. 12. There would be a fairly large number of entry nodes in this case, since the number of seismic sensors in the global network runs into the tens of thousands. The entry processes would examine a continuous stream of seismic waveform data, and extract various kinds of information that would be deemed useful for detecting and locating earthquakes in real time. Such information might take the form of what is called a "pick" (L10 and L12 in FIG. 12) which represents the arrival of a specific earthquake phase at a sensor. In that sense, a "pick" would be a point in space time, comprised of the location of the sensing device combined with the time that the phase arrived.

In this example, as the entry processors generated these picks, they would be sent to the first processing executable tree at A4 in FIG. 10, where a global association algorithm would gather picks into specific, locatable earthquakes while at the same time winnowing out the more than 99% of the "picks" that had nothing to do with earthquakes at all. In FIG. 10, this could be the process at A4 which also would calculate the location of the actual earthquake in space and time.

Furthermore, the executable tree structure of each node would often include the addition of additional static information, as for example, the location process would require access to one or more databases of seismic station locations in order to perform the required calculations.

Once an earthquake is located, it can be processed in parallel by subsequent processes to calculate derived information that is dependent on knowing the location. One such process might be to calculate the magnitude of the event, say at A5, and another might calculate a property of earthquakes called the seismic moment at A6. Since these algorithms are mutually independent, they can advantageously be applied in parallel, since such information is often needed as soon as possible for tsunami hazard mitigation or disaster response purposes.

In this particular example, the processing at A7 in FIG. 10 is a fusion operation where all of the information for a single earthquake is combined into an integrated solution including all known properties of the event. This stage might also involve a human intervention to verify that the automatic processing performed by earlier stages were correctly applied, since the consequences of error might have extreme human impact. Finally, the results are passed to an archiving stage at A8 where the information is added to a catalog of earthquakes so the results can be made available to the general public.

Intelligence gathering occurs in many spaces, including critical facilities security, cybersecurity, military operations, market analysis, sales profiling, and enterprise strategic planning. The homoiconic graph framework approach will have significant impact in this space.

If image analysis is part of a surveillance activity, then the structure of the sensor systems is another system of systems that can be integrated using the homoiconic graph framework. For example, sophisticated surveillance systems generally comprise a hierarchy of components including focal plane arrays, mirrors, and actuators that must be precisely understood if accurate geo-referencing of any resulting imagery is to be achieved. Also, in such systems, tracking events that vary from image to image, especially when separated in time, becomes an important role in intelligence gathering, and these associations are yet another manifestation of information that can be integrated using the approach described herein.

Supply chain management is often an entire division in major companies, and integrates the many needs of various projects and products with the many items on the acquisition schedule. This creates a complex of many-to-many relationships. Inefficiency in this area leads to late delivery and budget overruns, as parts need to be ordered with expedited handling on a minute by minute basis. Both of these seriously erode customer satisfaction leading to a loss of business. This invention will be ideal to help ensure that neither of these happens.

Example 3

Knowledge Exploitation

There are many knowledge exploitation applications presently including areas like finding information on the Internet, discerning stock trading patterns, finding political voting patterns etc. The commonality is a reliance on "big data analytics". In this space massive amounts of data need to be assembled and mined for information. When utilizing the typical centralized application approach, current state of the art is using technologies like Hadoop, Pregel, Map/Reduce and such combinations. Practitioners spread large data sets over massive clusters of computers and that then perform simple filtering operations of subsets of the problem. Often data queries are expressed in a simple scripting language, such as 'R', and the filter is in a sense "sprayed" at the data.

There are many applications where this approach might be considered optimal, such as applications to finding known patterns. However, there are many more where a distributed filtering paradigm performs poorly or not at all such as finding unanticipated patterns and relationships. This is exactly where an executable graph solution becomes optimal. Examples of such problems include: Bayesian Forests and large scale Bayesian learning networks, and the complex relationships that manifest in the intricate relationships among commodity prices, economic indicators, and evolving transaction strategies.

What these problems have in common is that all of them manifest complex, many to many relationships, as well as being comprised of entities that behave in vastly different ways. To attack problems of this nature, the executable graph strategy in a very real sense inverts the current approach of distributing a simple filter over thousands of collections of static or slowly involving data.

In knowledge exploitation embodiments, an executable graph approach to big data analytics formulates the problem by distributing rapidly evolving data over a large array of collections of processes, each of which explores its relationship to other entities, each behaving in their own way. The executable graph approach complements typical big data approaches in exactly that class of problems where they perform poorly.

An example embodiment extends the earthquake association problem described in Example 2, by bringing the present invention's fractal foundations to the fore. For an organization processing data from the global network of thousands of seismic recording sites, processed picks run between 20 and 50 billion per year, resolved to between 50,000 and 100,000 earthquakes in any given year above a 2.5 magnitude.

In this embodiment there is a many to many relationship between picks and quakes (FIG. 13), with some earthquakes being associated with many hundreds of picks, and during intense aftershock sequences, possibly dozens of possible quakes potentially associatable with a single pick.

The current embodiment finds the single earthquake that is "most likely" to be the cause of the pick in some probabilistic sense. It can be seen that this is a many to many problem of major proportion.

In this embodiment the solution comprises all properly associated earthquake hypocenters and all associated picks with the hypocenters linked to the picks to which they have been associated. Conversely, the picks are linked to the single earthquake to which they have been associated.

Further descriptions that the embodiment picks enter this cloud of data unassociated, and candidate earthquakes are assembled from these unassociated picks. Initially there are more "nucleations" (possible earthquakes) than actual events, and the association process involves moving pick assignments from candidate to candidate until only a correct hypocenter for each quake remains, and each pick is assigned to only a single hypocenter. The data space can be thought of as a kind of "gas cloud" of atomic species that are assembled into stable molecules when processed completely.

An implementer skilled in the art would likely use two indices, one listing all of the active picks being associated, and the other containing the list of all active candidates. At this point the picks and quakes would have a many to many relation to each other, while the job of the association process is to change that into a one to many relationship between quakes and picks while simultaneously rejecting the vast number of picks that have nothing to do with earthquakes at all.

Figure 13:
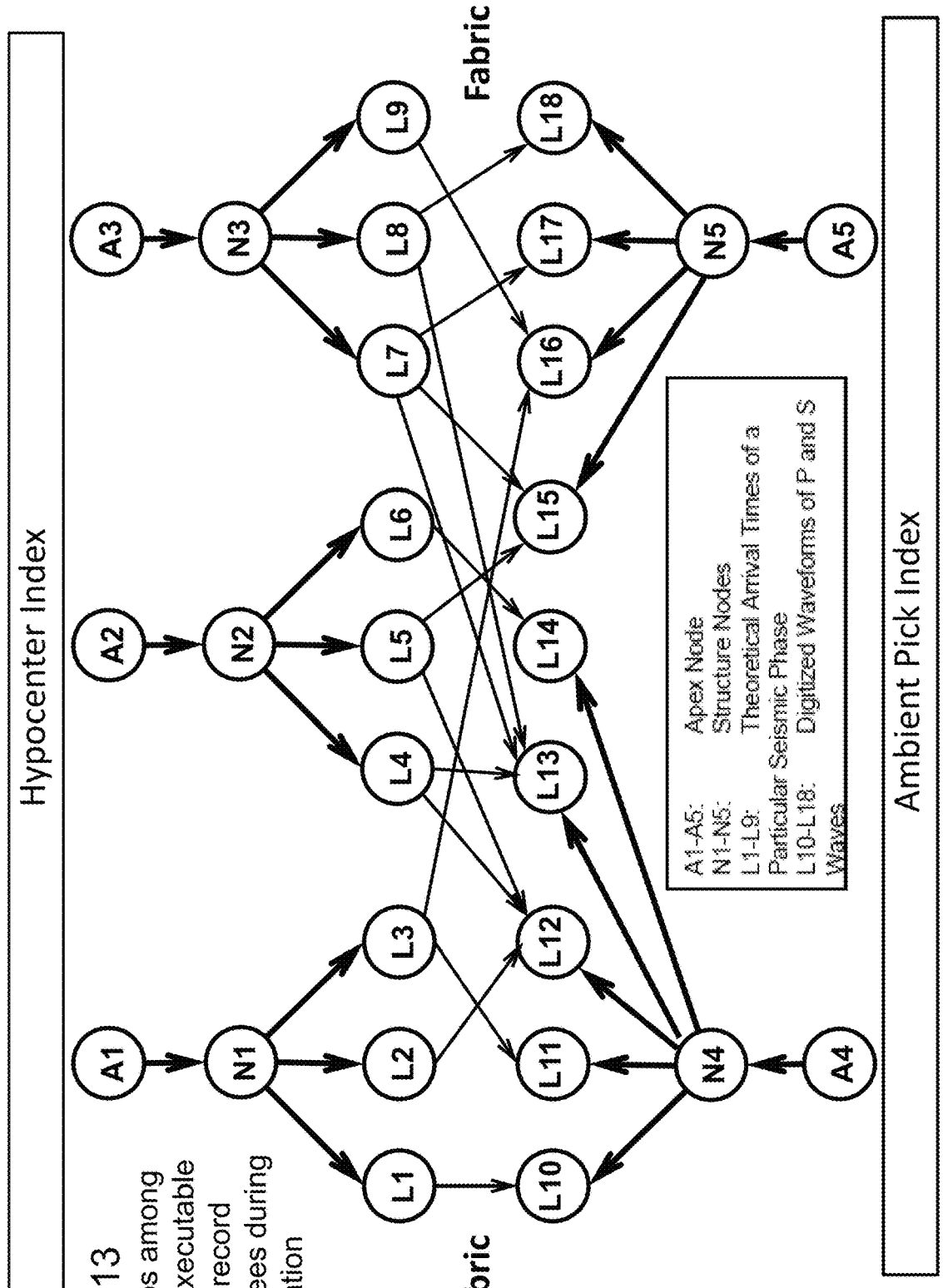
FIG. 13: Relationships among hypocenter executable trees and record executable trees during association.

One skilled in the art using the present invention may support the analytics for the global associator with a structural organization comprised of a mixture of two types of executable trees shown in FIG. 13.

Generally, earthquake picks are obtained from what is called a "seismic record". In the past, this was one day of seismic waveform recorded in ink on a rotating drum device called a "helicorder". For current digital technology, a record would be an arbitrary period of time from a seismic record that was digitized at the recording site. FIG. 12 shows an example of a digitized seismic record from a small (magnitude 3.1) earthquake recorded in Iceland. The example shows two arriving phases of seismic energy, and P wave (Labeled L10) and an S wave (Labeled L12), related to the corresponding leaf entities in FIGS. 13 and 14.

In this example, all of the picks from one seismic record might be represented by a single executable tree. In FIG. 13, such an executable tree is shown with an Apex labeled A4. Also, as shown in FIG. 13 at this stage before processing, a single "record" would have multiple picks for multiple earthquakes. Two of these "record" oriented executable trees are shown in the figure, with Apexes A4, and A5.

In this example, the other type of executable tree relevant to the distributed association space is the hypocenter, shown in FIG. 13 with Apexes A1, A2, and A3. The leaves of these executable trees, L1 through L9 each represent the theoretical arrival times of a particular seismic phase at various stations of the global seismic network for the theoretical earthquake represented by the top Apex. Initially, the possible relationship between these theoretical arrival times and actually measured "picks" is a complex many to many relationship among these two types of executable trees.

The embodiment resolves the data down to a single pick associated with a single theoretical phase for a single hypocenter, so the problem of global association is to find an optimal match between the leaves of the "record" executable trees, and those of the "hypocenter" trees. The two horizontal bars at the top and bottom of FIG. 13 and FIG. 14 represent the indices for hypocenters and records respectively as discussed below.

Figure 14:
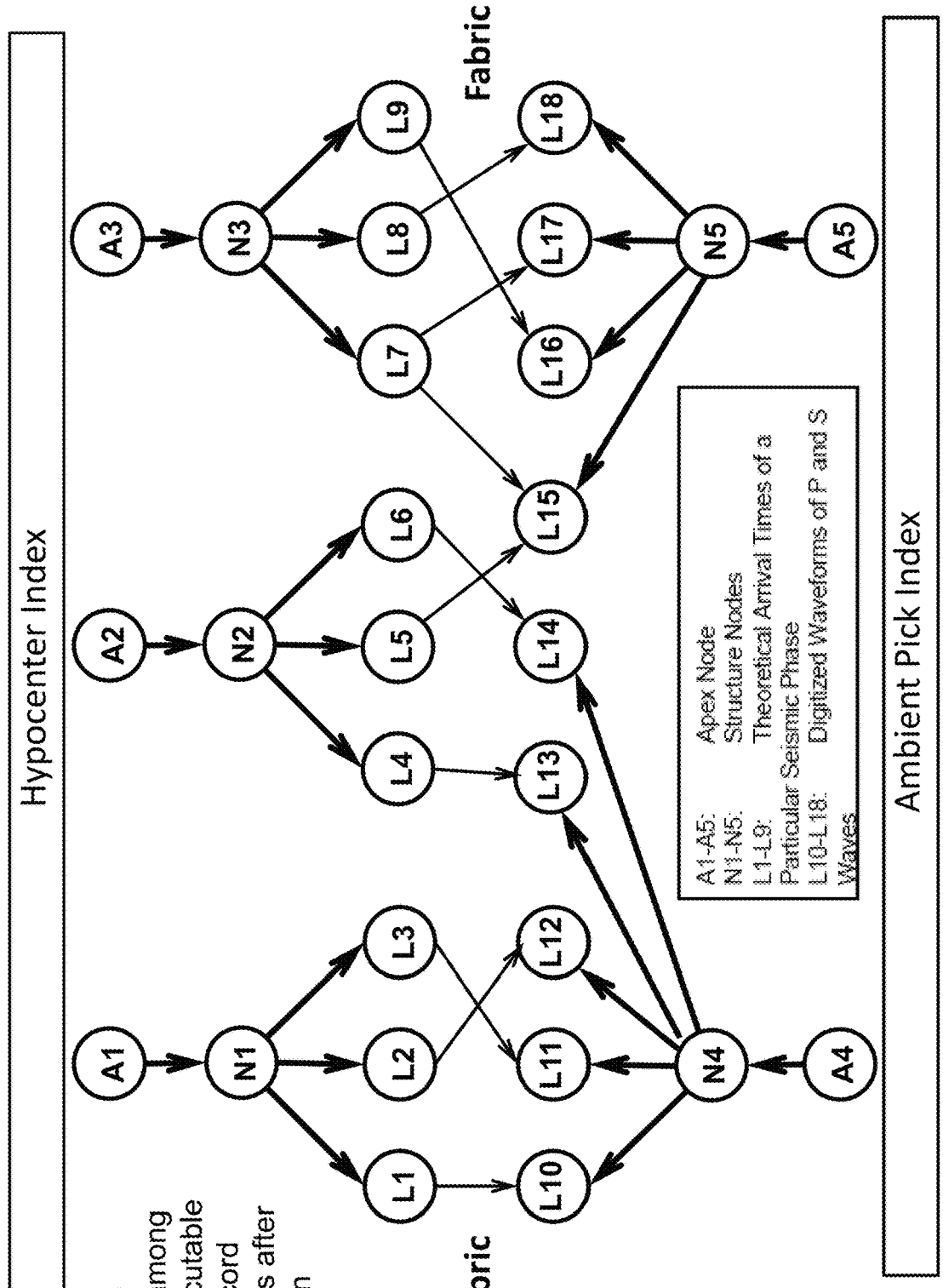
FIG. 14: Relationships among hypocenter executable trees and record executable trees after association.

It can be seen that the structures shown in FIG. 13 and FIG. 14 are very similar to those discussed with respect to information management, with the "record" trees taking on the role of priors to the hypocenter trees to which recorded picks might conceivably be associated. The layer labeled fabric links the leaves of the hypocenter executable trees with those of the record executable trees in the same manner, capturing the sense that the data "influences" the calculation of the respective hypocenters.

The present invention's fractal structure is displayed here also. This example for knowledge exploitation applications is embedded within another higher level executable graph framework that is in the process flow application space, reflecting both the fractal aspect of the executable graph framework and also the homoiconic aspect as the internal and external representations are similar, even as the physical representation is fractal in nature. In fact, to emphasize this point, nature is fractal, and approaches that do not represent solutions in the same manner are likely not to be as effective at addressing and solving these kinds of problems.

In the present example, each hypocenter and its associated picks is in and of itself an executable tree but, unlike the first two examples, these are not connected by any kind of a plexus structure. Instead, problems in the knowledge exploitation application space require a mechanism for indexing individual entities, and these indices are then used, as in the case of the earthquake/pick association problem to find meaningful patterns in a very large collection of data. The specific form of index used in this process is not specified in this invention, and one skilled in the art can understand they may take a variety of forms. For example, one simple approach with respect to the earthquake association problem would be to represent each of the pick list and the candidate hypocenter lists as time sorted lists. This kind of index would work in this case, because the number of active picks is generally less than a few thousand, and the number of active candidate quakes is generally less than a few hundred. However, for other problems, a simple sorted list would not be sufficient and some form of more effective referential index such as a B-Tree might prove to be more effective. In other applications, one might imagine that indexing scheme that reflected the fractal nature of the executable graph structure itself might be most effective.

One skilled in the art could see other applications, such as large, macroeconomic models, for analyzing the effects of new tariff laws of trading arrangements. In this embodiment the various players are individually modeled, and learn their behavior from historical data. In ecological modeling, space knowledge for each species is used to model each individual species' behaviors, which is then extended to understand the effect of changing environmental stress factors in the interaction of communities of such entities. In a more general sense, adjusting the marginal probabilities in a large scale Bayesian Learning Network is handled in much the same way, with each node in the network self-optimizing to find a global solution—that is, computational intelligence that "thinks globally" while "acting locally", a feature which is also discussed in Example 4, with respect to adaptive collaborative automation. Finally, in marketing and trading, which also impinges on product placement, market trends emerge as entities representing variously stocks, indicators, together with buying and selling strategies interact to discover trends and interactions that are too subtle to be revealed by simple distributed filtering approaches. While each of these applications has been addressed at small scales, executable graphs make it possible to extend such analytics to vastly larger problem spaces.

One further example involves the integration of a large scale Bayesian learning network with a big data application. In this example, from the health informatics field the user desires to develop a decision support tool that provides a physician diagnostic help during a patient interaction. Secondarily, the physician also needs to maximize the quality of his services and comply with certain governmental regulations as regarding payments. The Bayesian learning network represents the probabilistic relationship between diseases, symptoms and biographical data. Another dimension represents the relationship between certain quality metrics of Medicare's physician quality reporting system, as well as a pay for quality system that may favor certain procedures as far as reimbursement over other based upon quality measures.

In the Bayesian network observable qualities; latent variables, random variables and hypotheses are represented in the graph structure. The homoiconic and reflective aspect of the invention is displayed here in the fact that the body of knowledge continues to grow and change as new relationships are created and destroyed dynamically between both executable trees and within executable trees. The plexus of the executable graph represents the Bayesian learning network where the nodes represent the integration of various probability functions and the leafs represent the data that influence the calculation of the probability functions.

Another embodiment involves providing fast and accurate answers regarding the history and complex relationships among commodity prices, economic indicators, and evolving transaction strategies to a stock-trading manager. This involves overlapping areas such as managing big data, mining that data, modeling multi-to-multi relationships and artificial intelligence for finding patterns.

The trading manager may also want to integrate certain proprietary information beyond publicly available information and do this quickly. This information could take the form of a relational database of information, lightly traded corporate bond information or data in graph structures. The homoiconic nature of the executable graph framework would allow an application provider or possibly the user themselves to create a data virtualizer that would ingest the new information to be integrated without translation. As the original information changes, the virtualizer has a map to the location of new information. The multi-to-multi relationships of the present invention are utilized to represent both data relationship and program relationship doing away with massive joins inherent in relational database and one skilled in the art can appreciate the speed increases in understanding the cause and effect of actions.

One skilled in the art can also appreciate that the previous example of a Bayesian learning network could be used to provide the probability that if a certain action (a trade) takes place what the outcome will be or any number of other complex questions that incorporate multiple variables and relationships.

Example 4

Adaptive Collaborative Automation

The present invention includes applications where automated machines need to collaborate to solve problems. While it might seem that this embodiment is quite unlike the former three, in fact the executable graph structure embraces these types of applications just as easily.

In this example, an automaton is taken to be a collection of sensors and actuators that allow a system to sense the environment in its surroundings and to take action through manipulation of those actuators. The actuators can take the form of robotic arms, temperature controllers, valves, or adjustable platforms that can be used to redirect integrated sensors, to name just a few of the many possibilities. In this way, such an automaton is also taken to be capable of learning from its experiences, and increasingly capable of performing its mission, whatever that might be, more efficiently as well as sharing such capabilities gained from experiences with other automata of the same type. The latter is a direct application of the executable graph technology of the present invention, which integrates processing with the structural aspects of the problem. In this case, the processing would involve computational intelligence. The notion of an automata is a machine or a device that is capable of operating on its own independently of direct human control. In current usage, an automata could be taken to be a "thing" in the Internet of Things.

This space is arguably one of the most important application areas for executable graph technology. The number of applications that fit in this space include, among many others mentioned above, include: interaction of infrastructural components of a "smart" community; and large scale MSVA (modeling, simulation, visualization, and analysis).

One preferred application of the executable graph technology of the invention relates to security and infrastructure issues currently faced by the national power grid. The national grid is currently a tightly integrated network of power generation and control capability spanning the entire United States. It is, unfortunately, the very nature of this extremely complex systems of systems and many to many relationships between them that is both its strength as well as its critical weakness and fragility.

In the past, cascading failures have led to regional blackouts lasting for days, and more recently, the specter of cyber threat has put the security of our entire nation at risk. Central to this dilemma is what is called "model predictive control", where the behavior of a complex model of the situation is used to set up intricate response rules at the various nodes of the system. Such system architectures, however, tend to become dangerously fragile with time, as components are added, removed, or become obsolete. The inter-operating components end up with control logic which is "burned in", and is often left in place do to the incredible cost of managing the complex interaction of the components, leading to cascading failure modes.

In similar fashion, the cyber security threat is also enhanced by centralization, where a carefully crafted attack can bring down large portions of the grid, leaving much of the nation without power for extended periods of time. Large, complex and multiply connected systems are also plagued by another problem in that attempts to integrate new equipment or optimize the efficiency of existing equipment is defeated by the unintended consequences that arise when the complex interactions of the various components are not properly understood or modeled.

An embodiment of the present invention based on an executable graph approach would circumvent such cataclysmic failure modes by replacing the complex, centralized, systems with a collection of collaborative automata (machines). This approach to distributed generation and control with respect to the national grid has been called "power islanding" or "micro-grid", and the generation capabilities have been labeled "virtual power plants". Each of these components would be represented in the executable graph approach as a collection of executable trees, depending of the complexity of the system or system of systems being modeled that communicate and "negotiate" with adjacent power islands in a power sharing capacity. Failure of one such component would not in general propagate, and local power could be quickly restored because of localization of the failure. Examples of power islanding might include an array of solar cells, a community that produces both power from rooftop solar panels, and consumes power in residential units, or possibly an industrial area that both used and produced extra power as part of its normal operation. A key to evolution, leveraging the intrinsic capabilities of an executable graph approach, is that the components would learn in time how to optimize their performance, anticipating the need for power by storing energy locally as needed.

A further embodiment in our built environment (such as buildings, roads, etc.) deals with environmental management allocating resources such as heat, power, and air-flow in a building. For example, some enterprises maintain large computer facilities with rapidly changing power consumption and heat production based on the number of processors needed to service the processing load. If the temperature at the processors is not maintained within a rather narrow operational envelope, costly failures, lack of service, and replacement could result.

Such systems tend to be designed conservatively with substantial excess capacity and redundant components. The most common approach to the design process is something called model-predictive controls, where an expensive air-flow modeling effort (computational fluid dynamics) is conducted to ensure that the designed systems can stay within operational tolerances. Whenever the load increases or decreases, or equipment is added or removed, this costly process must be repeated. In addition, because the set point based controllers (e.g., proportional-integral-derivative (PID) controllers) for these systems are rigid in their response, the system must be greatly overdesigned with respect to capacity, increasing initial on ongoing operational costs. Such systems must be continuously checked and "tweaked", opening the possibility of costly human error.

Figure 15:
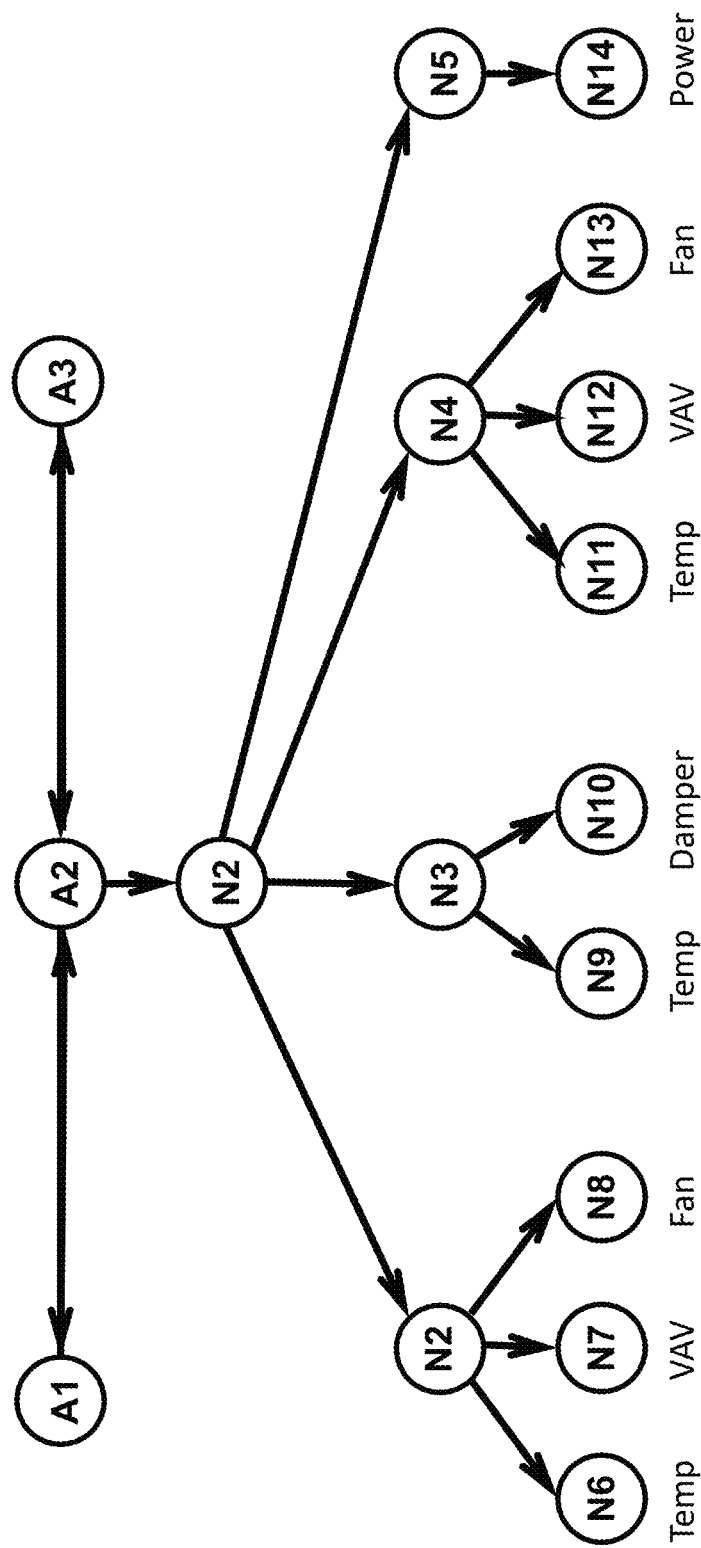
FIG. 15: Simplified example of thermal control system for computer cluster.

In this example, the present invention avoids these problems by bringing in the concept of self-optimization against defined and general performance standards, for example that the temperature at given points must be maintained within certain specified bounds. An approach is to overlap a collection of "zone control" automata (such as shown in FIG. 15) throughout the facility. Since these components are self-optimizing, there is no need to over-design the facility, nor is it necessary to compensate for excessive granularity in the control systems, since they are adaptively optimized at a finer scale from learned behavior during operations. Intercommunications between overlapping zone controllers, allows adjacent zones to compensate when components of a single zone fails and until corrective maintenance can be applied. For critical situations where the cost of failure is extreme, the learning process is augmented by duplication of the infrastructure operated in parallel where extreme stressors can be applied without endangering systems or users of those systems.

FIG. 15 shows a vastly over-simplified example of one embodiment of a zone controller. The zone with apex A2 is comprised of a number of structural nodes eventually ending in nodes in the hierarchy that represent the sensors and actuators that measure and adjust to ambient changes in the systems as the load varies. The overall "brains" of the zone controller are found in the structural node labeled N1, and nodes N2 through N5 are sub-components that ultimately interact with the various sensors and actuators designated N6 through N14.

Implementations such as that shown generally do not have leaf nodes of fabric connections, so all of the intercommunication is through the plexus. In FIG. 15, A1 and A3 are apexes of adjunct control zones (details not shown to reduce complexity). FIG. 9 shows a larger group of collaborative zones labeled A1 to A10 that are linked into a mesh network all collaboratively operating to manage the processor load and temperature of the system.

The number of levels for the structural nodes is not limited to a single layer. In the diagram, there are shown four sub-components. The ones at N2 and N4 are similar and each is made up of three sub-sub-components, a temperature sensor Temp, a variable air volume system labeled VAV, and a variable speed motor labeled Fan. In this very simple system, the VAV actuator has control motors that can position the direction of flow in some optimal manner. The second sub-component at N3 is simpler—it is a simple vent with a thermal sensor that can be opened and closed as necessary to control airflow and consequently distribution of cooling effect. Finally the sub-component at N5 is simply a power sensor, since in a general sense, the overall heat production is proportional to the power being consumed and converted to heat by the processors in the zone covered by each zone controller.

In the preferred embodiment, each level would have appropriate computational intelligence structured in a fractal nature. Based upon the particular computational intelligence algorithms selected by one skilled in the art learning would take place at each of those layers and be able to anticipate load based upon the history obtained from operations or access predictive weather data and let the temperature reach the top of the optimal range because the system would learn that at night the thermal losses of the building would increase.

In the foregoing explanation the introspection capabilities are described, but the reflective capabilities of the present invention are also important. As the computational intelligence system learns, new data is obtained that using reflection can be incorporated into the structure by changing the properties of individual nodes as well as by modifying the structure of the executable graph itself. As described elsewhere herein the structure is adaptable and can easily incorporate these new capabilities.

A computer system does not exist in isolation within a building or facility, and to treat it as such results in considerable waste of valuable resources and increased operational costs. In an isolated design, the heat generated by the computer processors must be discarded in some way either by venting to the exterior environment or by producing cooled air by means of some kind of chilling system that consumes power. A better solution is to use the byproducts of one system in a facility to provide for a need in some other part of that facility, and this is where the fractal nature of an executable graph solution comes to bear again. Just as executable trees can be nodes of other executable trees, the various systems operating within the framework of a single building can be integrated so that the excesses of one can supply the demands of another, such that the heat from a computer facility can reduce the cost of heating the parts of the building inhabited by humans during colder weather.

The foregoing embodiment is only one example, but taken a step further, the overarching executable tree that represents the aggregation of the systems in single buildings can themselves be integrated into overlapping systems (executable trees or xGraphs) wherein the byproducts such as waste, heat, or power can be used by other facilities, such as a waste energy conversion plant, HVAC (Heating Ventilation, and Air Conditioning) unit, and lighting respectively in adjacent buildings making up a community.

The application of the executable graph technology is not limited to the four application spaces chosen for a more detailed discussion. They were chosen to illustrate the range of applications that could be addressed that directly benefit from the structural simplicity, adaptability, and self-optimizing capabilities that executable graph provides. The examples were also chosen to illustrate the advantages that an executable graph design has over traditional approaches. As the complexity of the interaction between the components and systems that make up our built environment become more complex, rigid solutions and those that are based on centralized control and storage of static data simply do not scale sufficiently to provide robust solutions. The executable graph, or "executable graph" framework, was designed specifically to address these kinds of "wicked problems" where complexity confounds and thwarts our best intentions.

In another example, a smart community can be built up by using the fractal nature of the present invention. A system in a building can be part of a larger system of systems. For example the heat produced from a single server room can be used by the office space in the building. Conversely the excess power created by the solar cells on the nearby parking garage can be monitored and used when appropriate to power the data center. Layers of layers of executable graph frameworks can be fractally built upon each other (e.g., by nesting nodes within nodes, and nesting xGraphs within xGraphs) to control the interaction of infrastructural components of a "smart" community collaboratively.

In large scale implementations of modeling, simulation, visualization and analysis applications, the executable graph is both an extension of the 3D VIM interface where models are able to draw or render themselves but are able to calculate performance metrics and model reactions in some way. Another example within this space involves the complex and interacting ecosystems in ecological modeling. A single ecosystem to be modeled is built up of many complex models that interact with each other. A user developing a simulation model for analysis may construct a model of a single species of fish and how it interacts with its environment based upon factors such as salinity, oxygen carrying capacity, temperature, and other significant variables. This would be represented in a single executable tree. An ecosystem in nature is built up many different layers. A single fish may be modeled but it also interacts with the fish near it, the fish in a larger community as well as other species. This represents the fractal nature of the invention where the graph structure is similar at all scales. The leaves of that executable tree would be the variables of interest and would be interconnected with other executable trees representing other species, water conditions, man-made development or potentially thousands of individual models. All of these different models would incorporate the many-to-many relationships of the executable graph across a large-scale network of processes and data.

Example 5

Electrical Grid Control Systems, and Inter-Dependency of Disparate Networks

Another example to illustrate the fractal nature of a system resulting from connecting multiple executable graphs is a possible electrical grid control system. The control logic for a single house is similar in operation to the control logic for a group of homes or "microgrid", and is similar in turn to the control logic of an entire city, which itself is similar to the control system for an entire utility that serves an entire region, state, or country. The fractal nature of a multiple executable graph implementation allows and encourages the organization of problems into smaller problems that are easier to control and understand that then can be built up into ever larger collections of executable graph systems. Therefore, rather than having to understand and control the entire electrical grid and the smallest devices in a single home from a single location at the utility company, the control can be broken up fractally into smaller controllable systems but without disrupting the interchange of information and knowledge between various parts of the system.

Thus, by extending the possible applications of executable graphs to allow one or more systems or networks (on a single computer or a network of computers) to be connected to one or more other systems or networks. Thus, it becomes possible to contemplate an autonomous vehicle system (such as a ride-hailing service) being connected to an energy system in such a way that the combined system can be optimized for energy use (for example, to help balance the electrical grid), or to maximize some other criterion such as the deployment of vehicular assets for a concert that will finish in 2 hours at a particular venue.

Society is replete with systems that are very often disparate systems and previously considered to be unrelated to one another so that in common practice they do not effectively talk to each other. By using executable graph structures, there is a mathematical framework that can be adaptable enough for the various systems to connect together in a manner that results in the whole being greater than the sum of the parts.

The foregoing descriptions are intended to illustrate various aspects of the instant technology and should not be construed as limiting the scope of the appended claims. It will be apparent to one skilled in the art that many changes and modifications can be made thereto without departing from the spirit or scope of the appended claims.

What is claimed:

1. A method for managing information in a complex system, the method comprising:
   transforming the information into one or more homoiconic, reflective directed acyclic graphs, wherein the information comprises data and executable instructions embodied as entities;
   providing a user with a way to create one or more nodes in the one or more graphs,
   wherein the one or more nodes each have a set of executable instructions associated with them;
   providing the user with a way to connect a first graph of the one or more graphs comprising a first system or network, to a second graph of the one or more graphs, comprising a second system or network, thereby combining the first and second graphs into a single executable graph;
   providing the user with a way to assign the one or more nodes of the first and second graphs, using globally unique identifiers and strict rules, as apex nodes, top nodes, structure nodes, or leaf nodes;
   providing the user with a way to link the one or more nodes of the first and second graphs to each other using entity links and one or more of tree, plexus, or fabric structures;
   providing the user with a way to discover the capability of each of the nodes to connect with other nodes using discoverable entity interfaces and to connect nodes with other nodes using ephemeral entity links;
   providing the user with a way to execute the instructions associated with the one or more nodes of the first and second graphs; and
   displaying the results of executing the complex system in a form viewable by the user.

2. The method of claim 1, further comprising providing a user with a way to add one or more tags to the one or more nodes.

3. The method of claim 1, wherein the one or more graphs comprises at least one executable tree having a single apex node linked to a single top node, zero or more structure nodes linked to the top node, and a plurality of leaf nodes linked to nodes selected from: the top node and one or more of the structure nodes, if present.

4. The method of claim 1, wherein the links in the one or more directed acyclic graphs have a semantic meaning that is only related to their position in the graphs.

5. The method of claim 1, wherein the displaying the results of executing the complex system comprises executing instructions to provide the user with one or more of:
   a virtual world engine to display the graph;
   a 3D interface for navigating through the graph;
   a method for visually manipulating one or more nodes;
   a way to introduce new data or code visually into the structure; and
   a process for interrogating a node to display information about the node comprising operational parameters, performance, or data.

6. The method of claim 1, wherein the information is selected from: architectural programming and design data; seismological data; connectivity data between devices within the Internet of Things; and power management data.

7. A computing apparatus programmed with instructions to manage information in a complex system, the apparatus comprising:
at least one processor; and
at least one memory encoded with instructions to be executed by the processor,
wherein the instructions comprise:
instructions for transforming the information into one or more homoiconic, reflective directed acyclic graphs, wherein the information comprises data and executable instructions embodied as entities;
instructions for providing a user with a way to create one or more nodes in the one or more graphs, wherein the one or more nodes each have a set of executable instructions from the information associated with them;
instructions for providing the user with a way to connect a first graph of the one or more graphs comprising a first system or network, to a second graph of the one or more graphs, comprising a second system or network, thereby combining the first and second graphs into a single executable graph;
instructions for providing the user with a way to assign the one or more nodes of the first and second graphs, using globally unique identifiers and strict rules, as apex nodes, top nodes, structure nodes, or leaf nodes;
instructions for providing the user with a way to link the one or more nodes of the first and second graphs to each other using entity links and tree, plexus, and/or fabric structures;
instructions for providing the user with a way to discover the capabilities of each of the nodes to connect with other nodes using discoverable entity interfaces and to connect those nodes with other nodes using ephemeral entity links;
instructions for providing the user with a way to execute the instructions associated with the one or more nodes of the first and second graphs; and
instructions for displaying the processed information in a form viewable by the user.

8. The computing apparatus of claim 7, wherein the apparatus comprises two or more computing devices, and wherein the first and second graphs are each stored on a separate device.

9. A non-transitory computer readable medium, encoded with instructions for carrying out the method of claim 1.

10. A method for managing a complex process, the method comprising:
transforming the process into one or more homoiconic, reflective directed acyclic graphs, wherein the process comprises data and executable instructions embodied as entities;
providing a user with a way to create one or more nodes in the one or more graphs,
wherein the one or more nodes each have a set of executable instructions associated with them;
providing the user with a way to connect a first graph of the one or more graphs comprising a first system or network, to a second graph of the one or more graphs, comprising a second system or network, thereby combining the first and second graphs into a single executable graph;
providing the user with a way to assign the one or more nodes of the first and second graphs, using globally unique identifiers and strict rules, as apex nodes, top nodes, structure nodes, or leaf nodes;
providing the user with a way to link the one or more nodes of the first and second graphs to each other using entity links and one or more of tree, plexus, or fabric structures;
providing the user with a way to discover the capability of each of the nodes to connect with other nodes using discoverable entity interfaces and to connect nodes with other nodes using ephemeral entity links;
providing the user with a way to execute the instructions associated with the one or more nodes of the first and second graphs; and
displaying the progress and outcome of the process in a form viewable by the user.

11. The method of claim 10, further comprising providing a user with a way to add one or more tags to the one or more nodes.

12. The method of claim 10, wherein the one or more graphs comprise at least one executable tree having a single apex node linked to a single top node, zero or more structure nodes linked to the top node, and a plurality of leaf nodes linked to nodes selected from: the top node and one or more of the structure nodes, if present.

13. The method of claim 10, wherein the links in the one or more directed acyclic graphs have a semantic meaning that is only related to their position in the graphs.

14. The method of claim 10, wherein the displaying the knowledge comprises executing instructions to provide the user with one or more of:
a virtual world engine to display the graph;
a 3D interface for navigating through the graph;
a method for visually manipulating one or more nodes;
a way to introduce new data or code visually into the structure; and
a process for interrogating a node to display information about the node comprising operational parameters, performance, or data.

15. The method of claim 10, wherein the information is selected from: architectural programming and design data; seismological data; connectivity data between devices within the Internet of Things; and power management data.

16. A non-transitory computer readable medium, encoded with instructions for carrying out the method of claim 10.

17. A computing apparatus programmed with instructions to manage a complex process, the apparatus comprising:
at least one processor; and
at least one memory encoded with instructions to be executed by the processor, wherein the instructions comprise:
instructions for transforming the process into one or more homoiconic, reflective directed acyclic graphs, wherein the process comprises data and executable instructions embodied as entities;
instructions for providing a user with a way to create one or more nodes in the one or more graphs, wherein the one or more nodes each have a set of executable instructions from the information associated with them;
instructions for providing the user with a way to connect a first graph of the one or more graphs comprising a first system or network, to a second graph of the one or more graphs, comprising a second system or network, thereby combining the first and second graphs into a single executable graph;
instructions for providing the user with a way to assign the one or more nodes of the first and second graphs, using globally unique identifiers and strict rules, as apex nodes, top nodes, structure nodes, or leaf nodes;

instructions for providing the user with a way to link the one or more nodes of the first and second graphs to each other using entity links and tree, plexus, and/or fabric structures;

instructions for providing the user with a way to discover the capabilities of each of the nodes to connect with other nodes using discoverable entity interfaces and to connect those nodes with other nodes using ephemeral entity links;

instructions for providing the user with a way to execute the instructions associated with the one or more nodes of the first and second graphs; and instructions for displaying the outcome of the process in a form viewable by the user.

18. The computing apparatus of claim 17, wherein the apparatus comprises two or more computing devices, and wherein the first and second graphs are each stored on a separate device.

19. A method for extracting knowledge from information, the method comprising:

transforming the information into one or more homoiconic, reflective directed acyclic graphs, wherein the information comprises data and executable instructions embodied as entities;

providing the user with a way to connect a first graph of the one or more graphs comprising a first system or network, to a second graph of the one or more graphs, comprising a second system or network, thereby combining the first and second graphs into a single executable graph;

providing a user with a way to create one or more nodes in the one or more graphs, wherein the one or more nodes each have a set of instructions associated with them;

providing the user with a way to assign the one or more nodes of the first and second graphs, using globally unique identifiers and strict rules, as apex nodes, top nodes, structure nodes, or leaf nodes;

providing the user with a way to link the one or more nodes to each other using entity links and one or more of tree, plexus, or fabric structures;

providing the user with a way to discover the capability of each of the nodes to connect with other nodes using discoverable entity interfaces and to connect nodes with other nodes using ephemeral entity links;

providing the user with a way to execute the instructions associated with the one or more nodes of the first and second graphs, thereby extracting knowledge from the information; and displaying the knowledge in a form viewable by the user.

20. The method of claim 19, further comprising providing a user with a way to add one or more tags to the one or more nodes.

21. The method of claim 19, wherein the one or more graphs comprise at least one executable tree having a single apex node linked to a single top node, zero or more structure nodes linked to the top node, and a plurality of leaf nodes linked to nodes selected from: the top node and one or more of the structure nodes, if present.

22. The method of claim 19, wherein the links in the one or more directed acyclic graphs have a semantic meaning that is only related to their position in the graphs.

23. The method of claim 19, wherein the displaying the network comprises executing instructions to provide the user with one or more of:

a virtual world engine to display the graph;
a 3D interface for navigating through the graph;
a method for visually manipulating one or more nodes;
a way to introduce new data or code visually into the structure; and
a process for interrogating a node to display information about the node comprising operational parameters, performance, or data.

24. A computing apparatus programmed with instructions to extract knowledge from information, the apparatus comprising:

at least one processor; and
at least one memory encoded with instructions to be executed by the processor,
wherein the instructions comprise:

instructions for transforming the information into one or more homoiconic, reflective directed acyclic graphs, wherein the information comprises data and executable instructions embodied as entities;

instructions for providing a user with a way to create one or more nodes in the one or more graphs, wherein the one or more nodes each have a set of executable instructions from the information associated with them;

instructions for providing the user with a way to connect a first graph of the one or more graphs comprising a first system or network, to a second graph of the one or more graphs, comprising a second system or network, thereby combining the first and second graphs into a single executable graph;

instructions for providing the user with a way to assign the one or more nodes of the first and second graphs, using globally unique identifiers and strict rules, as apex nodes, top nodes, structure nodes, or leaf nodes;

instructions for providing the user with a way to link the one or more nodes of the first and second graphs to each other using entity links and tree, plexus, and/or fabric structures;

instructions for providing the user with a way to discover the capabilities of each of the nodes to connect with other nodes using discoverable entity interfaces and to connect those nodes with other nodes using ephemeral entity links;

instructions for providing the user with a way to execute the instructions associated with the one or more nodes of the first and second graphs; and instructions for displaying the knowledge in a form viewable by the user.

25. The computing apparatus of claim 24, wherein the apparatus comprises two or more computing devices, and wherein the first and second graphs are each stored on a separate device.

26. A non-transitory computer readable medium, encoded with instructions for carrying out the method of claim 19.

27. A method for creating an adaptive control network, the method comprising:

representing a plurality of automata by a network comprising one or more homoiconic, reflective directed acyclic graphs, wherein the automata comprise data from one or more sensors, and executable instructions that control one or more actuators, wherein the executable instructions are embodied as entities;

providing a user with a way to create one or more nodes in the one or more graphs, wherein the one or more nodes each have a set of executable instructions associated with them;

providing the user with a way to connect a first graph of the one or more graphs comprising a first system or network, to a second graph of the one or more graphs, comprising a second system or network, thereby combining the first and second graphs into a single executable graph;

providing the user with a way to assign the one or more nodes of the first and second graphs, using globally unique identifiers and strict rules, as apex nodes, top nodes, structure nodes, or leaf nodes;

providing the user with a way to link the one or more nodes to each other using entity links and one or more of tree, plexus, or fabric structures;

providing the user with a way to discover the capability of each of the nodes to connect with other nodes using discoverable entity interfaces and to connect nodes with other nodes using ephemeral entity links;

providing the user with a way to execute the instructions associated with the one or more nodes of the first and second graphs, thereby controlling the one or more automata; and displaying the network of automata in a form viewable by the user.

28. The method of claim 27, further comprising providing a user with a way to add one or more tags to the one or more nodes.

29. The method of claim 27, wherein the graph comprises at least one executable tree having a single apex node linked to a single top node, zero or more structure nodes linked to the top node, and a plurality of leaf nodes linked to nodes selected from: the top node and one or more of the structure nodes, if present.

30. The method of claim 27, wherein the links in the one or more directed acyclic graphs have a semantic meaning that is only related to their position in the graphs.

31. The method of claim 27, wherein the displaying the progress and outcome of the process comprises executing instructions to provide the user with one or more of:
a virtual world engine to display the graph;
a 3D interface for navigating through the graph;
a method for visually manipulating one or more nodes;
a way to introduce new data or code visually into the structure; and
a process for interrogating a node to display information about the node comprising operational parameters, performance, or data.

32. The method of claim 27, wherein the process is selected from: architectural programming and design methods; modeling seismological data; modeling connectivity between devices within the Internet of Things; and simulating power management.

33. A non-transitory computer readable medium, encoded with instructions for carrying out the method of claim 27.

34. A computing apparatus programmed with instructions to creating an adaptive control network, the apparatus comprising:
at least one processor; and
at least one memory encoded with instructions to be executed by the processor,
wherein the instructions comprise:
instructions for representing a plurality of automata by a network comprising one or more homoiconic, reflective directed acyclic graphs, wherein the automata comprise data from one or more sensors, and executable instructions that control one or more actuators, wherein the executable instructions are embodied as entities;
instructions for providing a user with a way to create one or more nodes in the one or more graphs, wherein the one or more nodes each have a set of executable instructions associated with them;
instructions for providing the user with a way to connect a first graph of the one or more graphs comprising a first system or network, to a second graph of the one or more graphs, comprising a second system or network, thereby combining the first and second graphs into a single executable graph;
instructions for providing the user with a way to assign the one or more nodes of the first and second graphs, using globally unique identifiers and strict rules, as apex nodes, top nodes, structure nodes, or leaf nodes;
instructions for providing the user with a way to link the one or more nodes of the first and second graphs to each other using entity links and tree, plexus, and/or fabric structures;
instructions for providing the user with a way to discover the capabilities of each of the nodes to connect with other nodes using discoverable entity interfaces and to connect those nodes with other nodes using ephemeral entity links;
instructions for providing the user with a way to execute the instructions associated with the one or more nodes of the first and second graphs, thereby controlling the one or more automata; and
instructions for displaying the network of automata in a form viewable by the user.

35. The computing apparatus of claim 34, wherein the apparatus comprises two or more computing devices, and wherein the first and second graphs are each stored on a separate device.

* * * * *